US010613895B2

(12) United States Patent
Osisek et al.

(10) Patent No.: US 10,613,895 B2
(45) Date of Patent: *Apr. 7, 2020

(54) VIRTUALIZATION OF STORAGE BUFFERS USED BY ASYNCHRONOUS PROCESSES

(71) Applicant: INTERNATIONAL BUSINESS MACHINES CORPORATION, Armonk, NY (US)

(72) Inventors: Damian L. Osisek, Vestal, NY (US); Donald W. Schmidt, Stone Ridge, NY (US); Phil C. Yeh, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,668

(22) Filed: Apr. 1, 2019

(65) Prior Publication Data
US 2019/0227833 A1 Jul. 25, 2019

Related U.S. Application Data

(63) Continuation of application No. 14/251,904, filed on Apr. 14, 2014, now Pat. No. 10,268,499, which is a continuation of application No. 12/394,844, filed on Feb. 27, 2009, now Pat. No. 8,701,120.

(51) Int. Cl.
G06F 9/455 (2018.01)
(52) U.S. Cl.
CPC ............ G06F 9/45558 (2013.01); G06F 2009/45579 (2013.01); G06F 2009/45583 (2013.01)

(58) Field of Classification Search
CPC ....... G06F 9/45558; G06F 2009/45583; G06F 2009/45579
See application file for complete search history.

(56) References Cited

U.S. PATENT DOCUMENTS

| 5,317,754 | A | 5/1994 | Blandy et al. |
| 5,544,349 | A | 8/1996 | Berry |
| 5,778,411 | A | 7/1998 | DeMoss et al. |
| 5,924,127 | A | 7/1999 | Kawamoto et al. |
| 6,092,128 | A | 7/2000 | Maas |
| 6,094,708 | A | 7/2000 | Hilla et al. |
| 6,446,194 | B1 | 9/2002 | Elsen et al. |
| 6,804,698 | B1 | 10/2004 | Richards |
| 6,832,295 | B1 | 12/2004 | Stonecypher |
| 6,973,553 | B1 | 12/2005 | Archibald |
| 7,065,630 | B1 | 6/2006 | Ledebohm |
| 7,421,533 | B2 | 9/2008 | Zimmer |
| 7,827,321 | B2 | 11/2010 | Bartik et al. |

(Continued)

OTHER PUBLICATIONS

"z/Architecture—Principles of Operation," IBM Publication No. SA22-7832-06, Seventh Edition, Feb. 2008, pp. 1-1292.

Primary Examiner — Meng Ai T An
Assistant Examiner — Michael W Ayers
(74) Attorney, Agent, or Firm — Steven Chiu, Esq.; Blanche E. Schiller, Esq.; Heslin Rothenberg Farley & Mesiti P.C.

(57) ABSTRACT

The amount of host real storage provided to a large guest storage buffer is controlled. This control is transparent to the guest that owns the buffer and is executing an asynchronous process to update the buffer. The control uses one or more indicators to determine when additional host real storage is to be provided.

6 Claims, 16 Drawing Sheets

(56) References Cited

U.S. PATENT DOCUMENTS

| | | |
|---|---|---|
| 8,032,701 B1 | 10/2011 | Glade |
| 8,701,120 B2 | 4/2014 | Osisek et al. |
| 2004/0068637 A1 | 4/2004 | Nelson |
| 2005/0268071 A1 | 12/2005 | Blandy et al. |
| 2006/0112212 A1 | 5/2006 | Hildner |
| 2006/0136761 A1 | 6/2006 | Frasier |
| 2006/0153185 A1 | 7/2006 | Jain |
| 2007/0106843 A1 | 5/2007 | Mori |
| 2007/0189231 A1 | 8/2007 | Chang et al. |
| 2008/0288238 A1 | 11/2008 | Heller |
| 2008/0307192 A1 | 12/2008 | Sinclair |
| 2009/0216964 A1 | 8/2009 | Palladino |
| 2010/0070677 A1 | 3/2010 | Thakkar |
| 2010/0088771 A1 | 4/2010 | Heller et al. |
| 2010/0223612 A1 | 9/2010 | Osisek et al. |
| 2012/0131303 A1 | 5/2012 | Goebel |
| 2012/0198453 A1 | 8/2012 | Osisek et al. |
| 2014/0237473 A1 | 8/2014 | Osisek et al. |

VIRTUALIZATION OF STORAGE BUFFERS USED BY ASYNCHRONOUS PROCESSES

This application is a continuation of co-pending U.S. application Ser. No. 14/251,904, entitled "VIRTUALIZATION OF STORAGE BUFFERS USED BY ASYNCHRONOUS PROCESSES," filed Apr. 14, 2014, which is a continuation of U.S. Pat. No. 8,701,120, entitled "VIRTUALIZATION OF STORAGE BUFFERS USED BY ASYNCHRONOUS PROCESSES," issued Apr. 15, 2014, each of which is hereby incorporated herein by reference in its entirety.

BACKGROUND

This invention relates, in general, to asynchronous processing in a virtual processing environment, and in particular, to providing host real storage to support guest storage buffers used by asynchronous processes of the virtual processing environment.

Processing environments can support different types of processes, including asynchronous processes and synchronous processes. An asynchronous process is a process that operates independently of other processes. In contrast, a synchronous process is a process that typically depends on another process. For example, a synchronous process expecting a response from another process will not proceed until it receives the response.

Asynchronous processes, including those executed in a virtual environment by guests managed by a host, sometimes require access to buffers in storage (also referred to as memory; storage and memory are used interchangeably herein). If the required buffer is large, it is disadvantageous, and at times, impossible or impractical, to allocate the entire buffer in host real storage. Thus, the buffer is allocated in blocks of real host storage, requiring careful management of the buffer. Such management tends to be difficult, especially when the large storage buffer is a guest storage buffer used by an asynchronous process. This is because certain exceptions, such as dynamic address translation faults, are not tolerated by such processes.

SUMMARY

Based on the foregoing, a need exists for a capability that enhances support of large guest storage buffers used by asynchronous processes executing in a virtual processing environment. In particular, a need exists for a capability that facilitates the provision of host real storage for the guest storage buffers.

The shortcomings of the prior art are overcome and additional advantages are provided through the provision of a computer-implemented method of facilitating the providing of host real storage for guest storage buffers in a virtual processing environment. The method includes storing data into a guest storage buffer in memory. The guest storage buffer is to be used by asynchronous processes in a virtual processing environment, and the virtual processing environment includes a host to provide the host real storage and one or more guests managed by the host. The guest storage buffer has n units of host real storage committed thereto and is larger than a total size of the n units of host real storage. The storing includes storing data into a current unit of the guest storage buffer. The current unit of the guest storage buffer is backed by a committed unit of host real storage. It is detected that the guest storage buffer is to have one or more additional units of host real storage committed thereto. The detecting includes comparing a value of an alert indication located in a data structure that includes control information with a value of another indication, separate from the alert indication, and determining that the values are equal. The value of the another indication is to be increased based on storing into a next unit of the guest storage buffer, and the value of the alert indication is updated based on committing the one or more additional units of host real storage to the guest storage buffer. It is specified to the host that action is to be taken by the host to commit the one or more additional units of host real storage, based on detecting, using the alert indication, that one or more additional units of host real storage are to be committed to the guest storage buffer. The specifying includes generating an alert interception to the host indicating that action is to be taken by the host to commit the one or more additional units of host real storage wherein upon the host receiving the alert interception: decommitting, based on the alert interception, units of committed host real storage committed to the guest storage buffer that are full other than the unit of host real storage committed to the current unit of the guest storage buffer, and subsequently committing, based on the alert interception, the one or more additional units of host real storage to the guest storage buffer. Based on the decommitting and committing, the value of the alert indication is updated. The updating increases the value by a number that is based on a count of the one or more additional units of host real storage committed to the guest storage buffer.

Computer program products and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
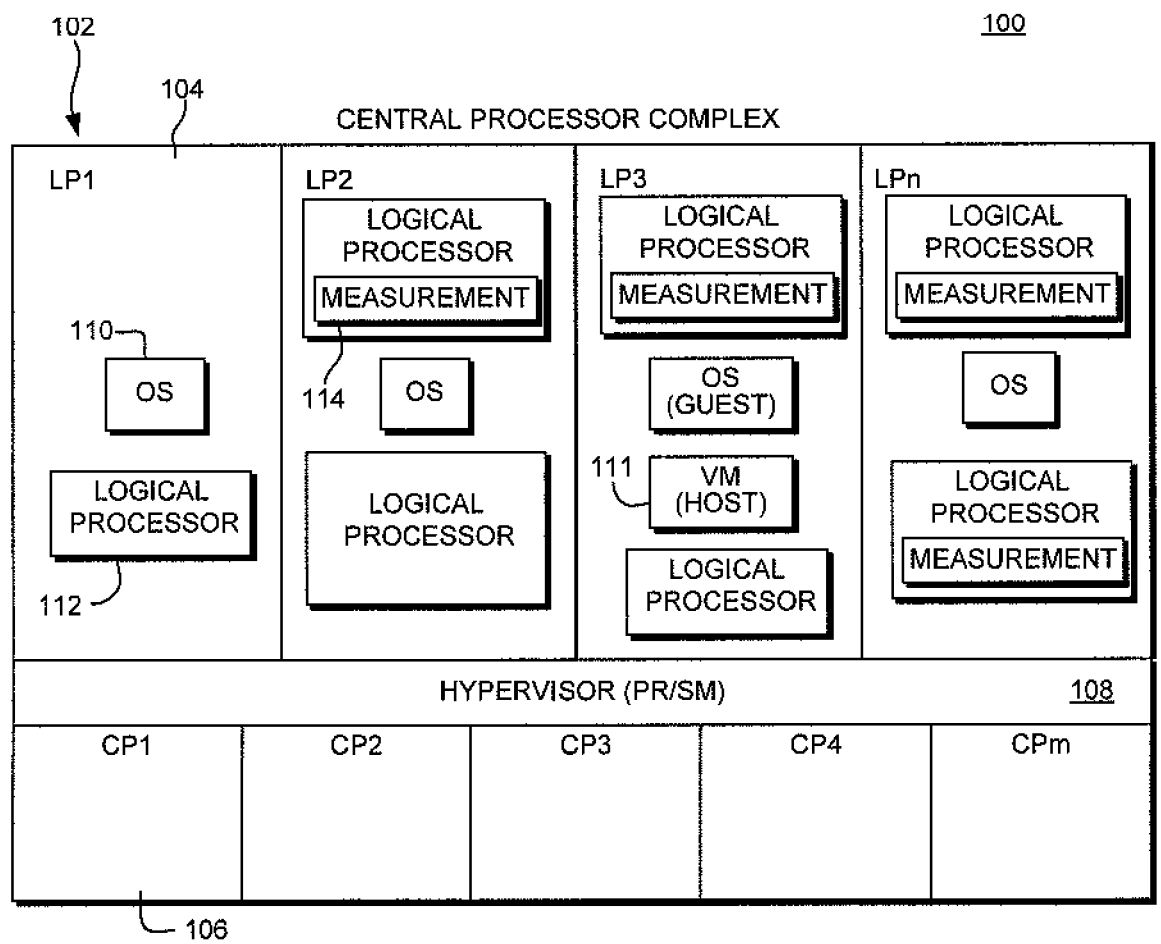
FIG. 1 depicts one embodiment of a processing environment to incorporate and use one or more aspects of the present invention.

In accordance with an aspect of the present invention, a capability is provided that enhances support for large guest storage buffers used by asynchronous processes in a virtual processing environment. This support includes efficiently providing adequate host real storage for the buffer without allocating host real storage for the entire buffer at one time. As one example, a guest includes processes and resources within the scope of an operating system; and a host includes processes and resources within the scope of a hypervisor.

One example of an asynchronous process that uses a large storage buffer (e.g., to store hundreds of megabytes of data) is a CPU measurement facility. The CPU measurement facility takes a snapshot of the central processing unit at specified sampling intervals to collect data regarding tasks (e.g., applications, modules, functions, instructions, etc.) executing on the central processing unit. This data is collected for statistical estimation of performance characteristics. The collected sampling data is stored in a buffer and at selected times, an interrupt is provided to remove data from the buffer to enable reuse thereof. The interrupt is not taken after each sample, but in sufficient time to remove data and minimize data loss.

In this example, the asynchronous process is virtualized in order to support concurrent use of the facility by multiple guests executing within the virtual environment. As an example, the measurement facility is virtualized such that a guest can independently control enablement/disablement of measurement, and multiple guests can be concurrently sampling. In one particular example, each logical processor assigned to a guest is capable of executing the measurement facility.

In the virtual environment, the buffer used by the asynchronous process is a guest buffer, which is supported by guest storage, such as guest virtual storage or guest real storage. The guest storage, whether virtual or real, does not exist as real storage (although the guest believes that it does). Therefore, host real storage is allocated to the buffer to support the buffer. The host real storage is to be allocated to the guest buffer prior to storing data in the buffer. That is, the guest storage buffer is to be pinned into host real storage in order to avoid a page fault.

In accordance with an aspect of the present invention, the host only pins a small number of units (n) of guest buffer storage at a time, so that only a small amount of host real storage is committed to this use. Then, one or more indicators are employed to determine when storage is to be committed to further guest buffer blocks. To pin an area of guest storage, the host allocates blocks of host real storage for any guest storage blocks in the area that are not already resident in host storage, pages the guest contents into them, maps the guest buffer blocks to those host real blocks, and then marks all guest blocks in the area (whether already resident or just mapped) ineligible to be paged out. This entails a commitment of at most n blocks of host real storage for the guest buffer at any time.

One embodiment of a processing environment to incorporate and use one or more aspects of the present invention is described with reference to FIG. 1. In one example, a processing environment 100 is based, for instance, on the z/Architecture® offered by International Business Machines Corporation, Armonk, N.Y. The z/Architecture® is described in a publication entitled, "z/Architecture Principles of Operation," IBM® Publication No. SA22-7832-06, Seventh Edition, February 2008, which is hereby incorporated herein by reference in its entirety. In one example, a processing environment based on the z/Architecture® includes an eServer zSeries®, offered by International Business Machines Corporation, Armonk, N.Y. z/Architecture®, IBM®, and zSeries® are registered trademarks of International Business Machines Corporation, Armonk, N.Y., U.S.A. Other names used herein may be registered trademarks, trademarks or product names of International Business Machines Corporation or other companies.

In this example, processing environment 100 includes a central processor complex (CPC) 102. Central processor complex 102 includes, for instance, one or more partitions or zones 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition can be independently reset, initially loaded with an operating system or a hypervisor (such as z/VM® offered by International Business Machines Corporation), if desired, and operate with different programs. An operating system, a hypervisor, or application program running in a logical partition appears to have access to a full and complete system, but only a portion of it is available. A combination of hardware and Licensed Internal Code (also referred to as microcode or millicode) keeps a program in a logical partition from interfering with a program in a different logical partition. This allows several different logical partitions to operate on a single or multiple physical processors in a time sliced manner. In this particular example, each logical partition has a resident operating system 110 and/or a resident hypervisor 111, which may differ for one or more logical partitions. In one embodiment, operating system 110 is the z/OS® or z/Linux operating system, and hypervisor 111 is z/VM®, offered by International Business Machines Corporation, Armonk, N.Y. z/OS® and z/VM® are registered trademarks of International Business Machines Corporation.

Central processors 106 are physical processor resources that are allocated to the logical partitions. For instance, a logical partition 104 includes one or more logical processors 112, each of which represents all or a share of a physical processor resource 106 allocated to the partition. The underlying processor resource may either be dedicated to that partition or shared with another partition.

Logical partitions 104 are managed by hypervisor 108 implemented by firmware running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

In this example, the processing environment is a virtual processing environment, and in one example, LP3 includes one or more guests (e.g., operating systems) controlled by a host 111 (e.g., a z/VM® hypervisor). Thus, in the examples herein, the host is the z/VM® hypervisor and the guest is the operating system running under z/VM®. Each guest has assigned thereto a logical CPU (a.k.a., logical processor). One or more of the logical processors executes, in this particular example, a measurement function 114 (e.g., a CPU measurement facility), which is an asynchronous process used to gather data on a regular basis to be used for debugging and/or to improve system performance. For each logical processor on which it is executing, it provides a snapshot of the logical processor at each specified sampling interval, which is a processing time interval as seen by the processor. Each snapshot produces a set of sample data, which includes, for instance, the instruction address of an instruction being executed and some state information about the logical processor. This sample data is stored, for instance, in one or more sample data blocks of a buffer. This buffer is an example of a guest storage buffer being managed by one or more aspects of the present invention.

Although the examples herein are described with reference to the CPU measurement facility, one or more aspects of the present invention are equally applicable to other asynchronous processes including, but not limited to, communications processes, networking processes and I/O processes. The CPU measurement facility is provided as only one example. Further details relating to the CPU measurement facility are described in U.S. Publication No. 2010/0088771, entitled "Virtualization Of A Central Processing Unit Measurement Facility," published Apr. 8, 2010; and U.S. Pat. No. 7,827,321, entitled "Central Processing Unit Measurement Facility," issued Nov. 2, 2010, each of which is hereby incorporated herein by reference in its entirety.

In describing the measurement facility, reference is made to the CPU. For a virtual environment, the CPU is a logical CPU (a.k.a., logical processor) assigned to a guest. Since a physical CPU may be shared among a plurality of guests in a virtual environment, state information and controls associated with measurement are maintained for each logical processor. Thus, in the discussion that follows, the controls are described, and then any additions or changes for the virtual environment are provided.

In one example, the CPU measurement sampling facility includes two sampling functions, several sampling control registers, several external interruption events and various instructions, each of which is described below.

The two sampling functions include, for instance, basic sampling and diagnostic sampling. The basic sampling function provides a set of architected sample data. The sample data includes an instruction address, the primary address space number (PASN), and some state information about the CPU, as examples. This allows tooling programs to map instruction addresses into modules or tasks, and facilitates determination of hot spots. The diagnostic sampling function provides a set of non-architected sample data, and is intended for use by hardware design analysts, operating systems, sophisticated compilers, and internal subsystems. Since the sample data provided by the diagnostic sampling function may reveal detailed internal hardware design, a console with a controlled password may be used to authorize use of the function.

Both the basic sampling and diagnostic sampling functions use the same sampling control registers, the same sampling buffer structure, the same external interruption events, and the same instructions. The main difference between these two functions is the sample data.

The sample data size and format for each sampling function are model dependent and are determined by, for instance, a 16-bit data entry format code, which is stored in each sample data. The sample data provided by the basic sampling function is not included in the sample data provided by the diagnostic sampling function. To get meaningful diagnostic sampling data, both sampling functions should be activated. The state of each sampling function can be individually set by executing a Set Sampling Controls instruction, which is described below. Both sampling functions are disabled by initial CPU reset, clear reset or power-on reset.

In one example, the external interruption events include an invalid entry address alert, an incorrect sample data block table entry alert, a program request alert, a sampling authorization change alert, and a loss of sample data alert. These events are part of an external interruption subclass, called the measurement alert subclass. The subclass mask bit, e.g., bit 58 of control register zero, is provided. This bit is initialized to one, which enables the interruption.

The CPU measurement sampling facility provides a number of sampling control registers. Except for authorization controls, the contents of these control registers are cleared to zeros by initial CPU reset, clear reset or power-on reset; and may also be cleared to zeros by executing the Set Sampling Control instruction that disables all sampling functions. Authorization controls are set or reset by an external means.

Figure 2A:
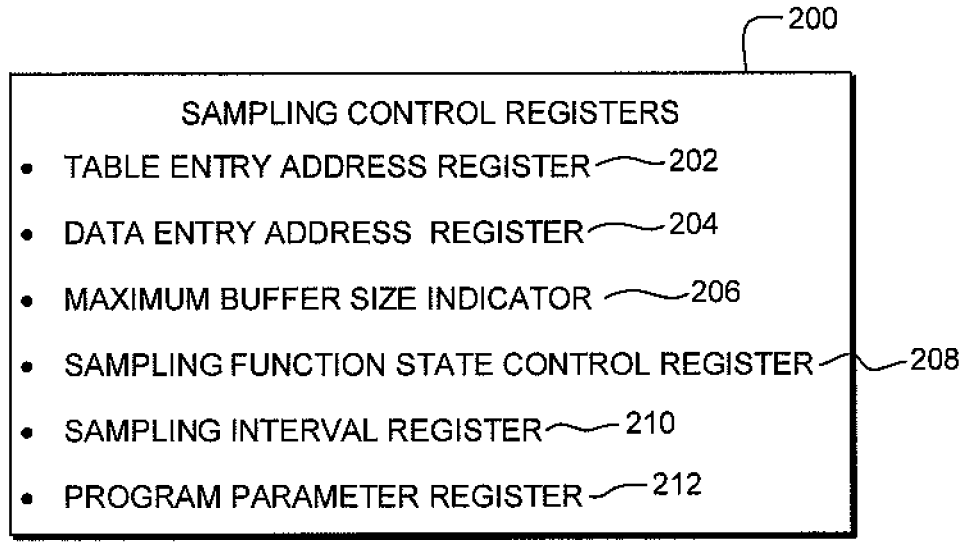
FIG. 2A depicts one example of various sampling control registers used in accordance with an aspect of the present invention.

Examples of sampling control registers are described with reference to FIG. 2A. In one example, these registers are hardware registers within the CPU. As shown, sampling control registers 200 include, for instance, a table entry address register (TEAR) 202; a data entry address register (DEAR) 204; a maximum buffer size indicator 206; a sampling function state control register 208; a sampling interval register 210, and a program parameter register 212, each of which is described below.

Figure 2B:
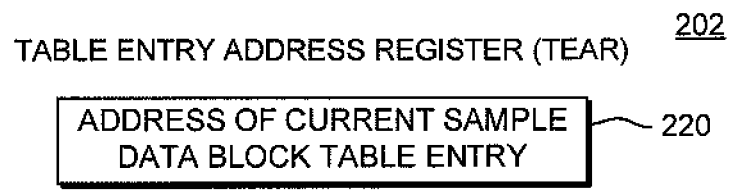
FIG. 2B depicts one example of the contents of a table entry address register of FIG. 2A, in accordance with an aspect of the present invention.

As shown in FIG. 2B, table entry address register 202 is, for instance, 64 bits, and includes, an address of a current sample data block table entry 220. It is unpredictable whether the address is real or absolute.

Figure 2C:
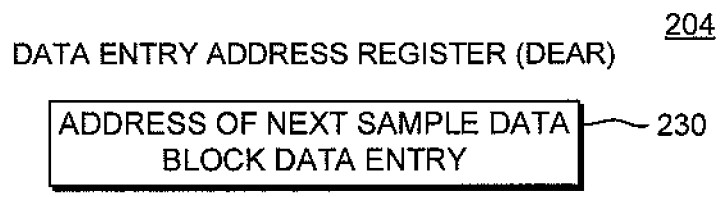
FIG. 2C depicts one example of the contents of a data entry address register of FIG. 2A, in accordance with an aspect of the present invention.

Referring to FIG. 2C, data entry address register 204 is, for instance, 64 bits, and includes an address of the next sample data block data entry 230. Again, it is unpredictable whether the address is real or absolute.

In one example, maximum buffer size indicator 206 is one bit. When the indicator is zero, the maximum size of the sample data block tables and the size of the sample data blocks are 4K bytes. When the indicator is one, the maximum size of the sample data block tables and the size of the sample data blocks are 1M bytes.

Sampling function state control register 208 is, for instance, 6 bits, and three bits are assigned to the basic sampling function and the other three bits are assigned to the diagnostic sampling function. For each sampling function, there are, for instance, three state control indicators, including: authorization control (A), enable control (E), and activation control (C).

Sampling interval register 210 is, for instance, 64 bits, and the contents of the register specify the number of CPU cycles within each sampling interval.

Program Parameter Register 212 is set by guest to identify the specific tasks which contribute to the sample data.

When the CPU is in the operating state, each sampling function can be in any of the following four states, as examples: unauthorized, disabled, inactive, and active.

Unauthorized: When a sampling function is in the unauthorized state, the function cannot be used and no sample data is stored. An external means is provided to authorize or unauthorize the use of these functions.

Disabled: When a sampling function is in the disabled state, the sampling function is authorized for use, but the program has not enabled the sampling function. When a sampling function is in this state, the function is authorized for use, but the control program has not enabled the function yet. In this state, no new sample data is stored, and the contents of the sample data blocks remain unchanged, and no sampling control, except for authorization controls, is preserved.

Inactive: When a sampling function is in the inactive state, the sampling function is authorized, enabled, and deactivated. When a sampling function is in this state, no new sample data is stored, the contents of the sample data blocks remain unchanged, and sampling controls are preserved and can be extracted.

Active: When a sampling function is in the active state, the sampling function is authorized, enabled and activated. When a sampling function is in this state, the function is authorized, enabled, and activated. In this state, new sampling data is stored during each sampling interval.

When the CPU enters the stopped state from the operating state, active sampling functions are stopped. When the CPU enters the operating state from the stopped state, sampling functions resume the states they were in when they were last stopped.

The following table summarizes actions that cause state transitions of a sampling function:

| | To | | | |
| --- | --- | --- | --- | --- |
| From | Unauthorized | Disabled | Inactive | Active |
| Unauthorized | —* | External control | Not applicable | Not applicable |
| Disabled | External control | —* | Enabled & deactivated by SSCTL. | Enabled & activated by SSCTL. |
| Inactive | External control | Disabled by SSCTL, or by reset[1]. | —* | Activated by SSCTL. |
| Active | External control | Disabled by SSCTL, or reset[1]. | Deactivated by SSCTL or by errors[2]. | —* |

Explanation:
[1] Each enabled sampling function is disabled by initial CPU reset, clear reset or power-on reset.
[2] Each active sampling function is deactivated by an invalid entry address alert, an incorrect sample data block table entry alert, or a loss of sample data alert.
*When a sampling function is in the unauthorized, disabled, inactive, or active state, if execution of SSCTL sets the state controls to the same state as the original state, the state controls are considered successfully set.
— No action required.
SSCTL The SET SAMPLING CONTROLS instruction.
Not applicable This state transition cannot occur.

In a virtual environment, the authorization, enable and activation indicators are maintained in a state description (e.g., a control block associated with each guest or logical processor). For instance, stored within the state description for each logical processor is a set of control blocks used to maintain this information. Examples of these control blocks are described with reference to FIGS. 2D-2H.

Figure 2D:
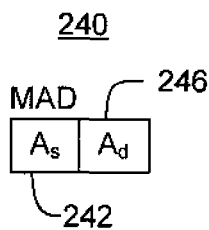
FIG. 2D depicts one embodiment of a format of a measurement authorization description bock, in accordance with an aspect of the present invention.
Figure 2E:
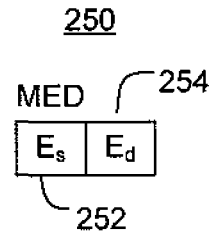
FIG. 2E depicts one embodiment of a format of a measurement enable description block, in accordance with an aspect of the present invention.
Figure 2F:
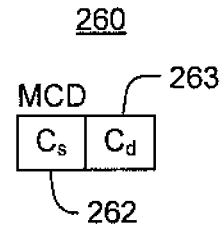
FIG. 2F depicts one embodiment of a format of a measurement activation description block, in accordance with an aspect of the present invention.

Referring to FIG. 2D, a measurement authorization description (MAD) control block 240 is used to control whether the guest is allowed to use each specified measurement function. These functions include functions of the sampling facilities of the measurement facility. In one example, measurement authorization description 240 includes the following controls:

(a) $A_s$ 242: Basic sampling authorization control—When $A_s$ is one, the guest is authorized to use the basic sampling function; when $A_s$ is zero, the guest is not authorized to use the sampling function.

(b) $A_d$ 246: Diagnostic sampling authorization control—When $A_d$ is one, the guest is authorized to use the diagnostic sampling function; when $A_d$ is zero, the guest is not authorized to use the diagnostic sampling function.

Another control block used is a measurement enable description (MED) block 250 (FIG. 2E), which specifies whether the guest has enabled each sampling function. The following defines the status, in one example:

(a) $E_s$ 252: Basic sampling enable control—When $E_s$ is one, the basic sampling function is enabled; when $E_s$ is zero, the basic sampling function is not enabled.

(b) $E_d$ 254: Diagnostic sampling enable control—When $E_d$ is one, the diagnostic sampling function is enabled; when $E_d$ is zero, the diagnostic sampling function is not enabled.

A further control block employed is a measurement activation description (MCD) control block 260 (FIG. 2F), which specifies whether the guest activated each sampling function. The following defines the controls, in one example:

(a) $C_s$ 262: Basic sampling activation control—When $C_s$ is one, the basic sampling function is active, when $C_s$ is zero, the basic sampling function is not active.

(b) $C_d$ 263: Diagnostic sampling activation control—When $C_d$ is one, the diagnostic sampling function is active; when $C_d$ is zero, the diagnostic sampling function is not active.

Further, a pending interruption parameter (PIP) of the state description includes the sources for the pending measurement alert external interruption, and is in the format of the external interruption parameter in the guest prefix area. In addition, a program parameter field of the state description includes the contents of the program parameter register.

Figure 2G:
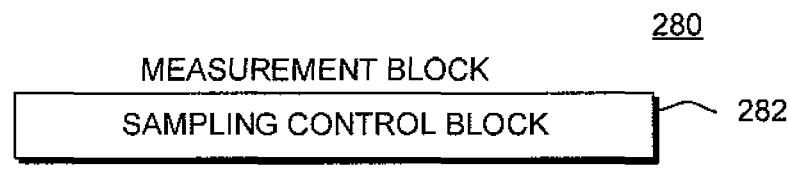
FIG. 2G depicts one embodiment of a format of a measurement block, in accordance with an aspect of the present invention.
Figure 2H:
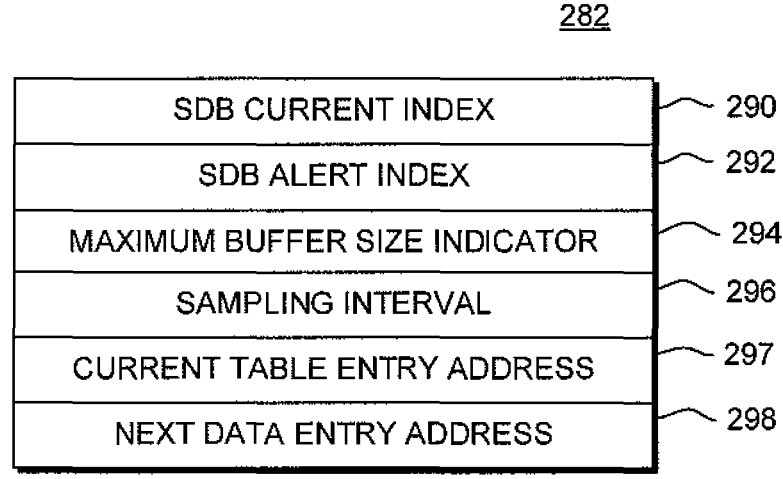
FIG. 2H depicts one embodiment of the fields of a sampling control block of the measurement block depicted in FIG. 2G, in accordance with an aspect of the present invention.

Moreover, a measurement block designation (MBD) of specified bytes of the state description includes an address that designates the origin of a measurement block in host real storage. One example of a format of the measurement block is depicted in FIG. 2G and described below. Any access exception occurred during access to the measurement block is reported by means of a validity interception.

As one example, a measurement block 280 includes, for instance, a sampling control block 282. The sampling control block is, for instance, 128 bytes, and includes some of the guest sampling control registers and additional control information. One example of a format of the sampling control block is described with reference to FIG. 2H.

In one example, sampling control block 282 includes, for instance:

(a) SDB Current Index 290: The contents of this field is incremented by one each time an SDB address is loaded into the data entry address register (described below) from an entry of an SDB table.

(b) SDB Alert Index 292: At normal completion of each SDB update process, the contents of this field are compared with the contents of the SDB current index. If they are equal, a buffer management alert interception is recognized at the completion of the current guest instruction.

(c) Maximum Buffer Size Indicator (S) 294: This indicator includes the maximum buffer size indicator.

(d) Sampling Interval 296: This field includes the contents of the sampling interval register.

(e) Current Table Entry Address 297: This field includes the contents of the table entry address register.

(f) Next Data Entry Address 298: This field includes the contents of the data entry address register.

The sample data is stored in a buffer in, for instance, main memory. For example, a number of sample data blocks (that comprise a buffer) are allocated by the control program (e.g., the operating system running as a guest) for the machine to store sample data during each sampling interval. Each sample data block is designated by a block link entry in a sample data block table. The current entry of the sample data block table is designated by the contents of the table entry address register and the next data entry of the sample data block is designated by the contents of the data entry address register. One example of the structure of a sampling buffer, in accordance with an aspect of the present invention, is depicted in FIG. 3.

Figure 3:
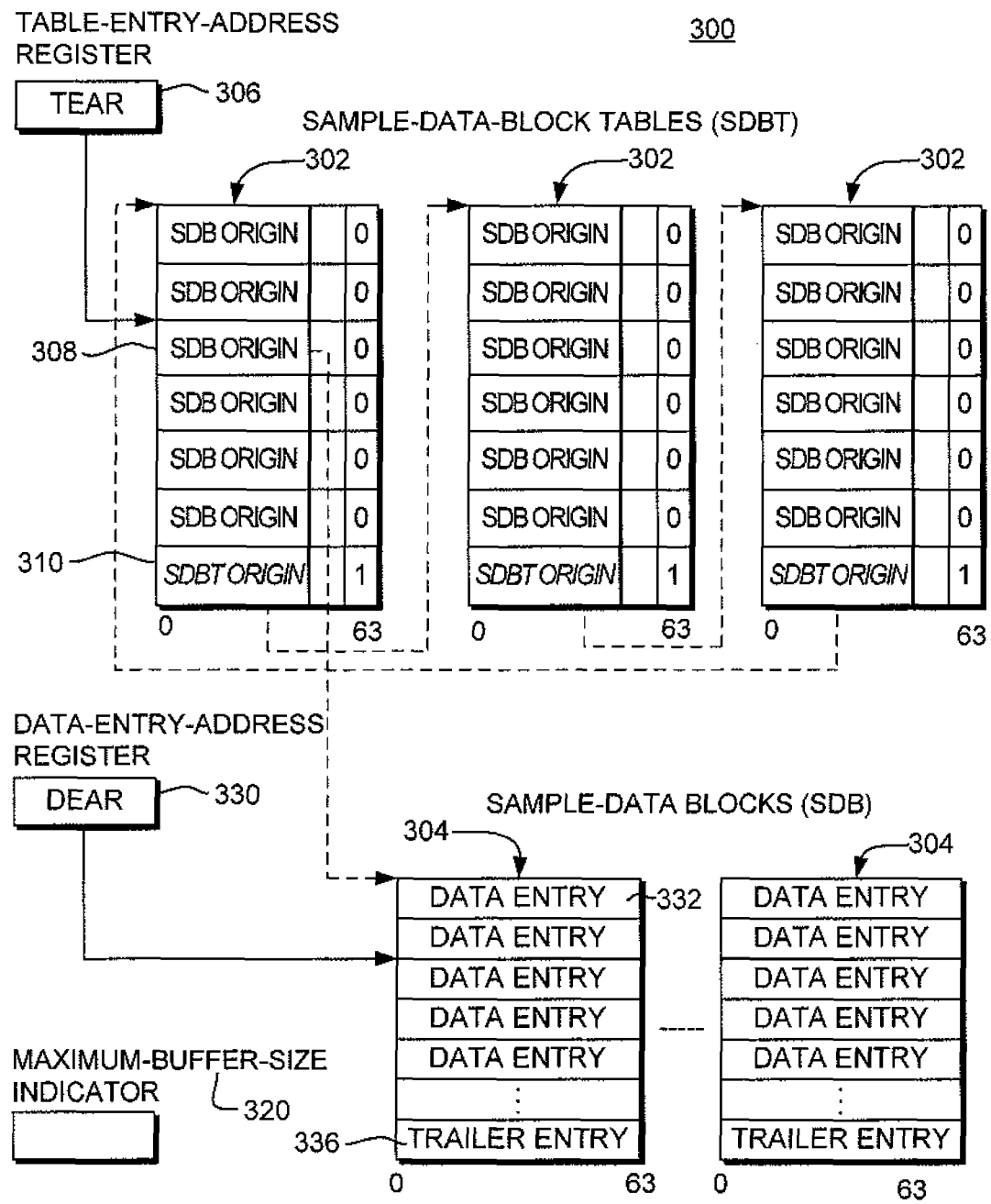
FIG. 3 depicts one embodiment of the structure of a sampling buffer used in accordance with an aspect of the present invention.

Referring to FIG. 3, a sampling buffer 300 includes one or more sample data block tables (SDBTs) 302 and one or more sample data blocks (SDB) 304. In this particular example, three (3) sample data block tables are shown, which are coupled in a circular linked list. Further, in this example, there are a plurality of sample data blocks. It is understood that other examples of the sampling buffer can have more, less or the same number of SDBTs and/or more, less or the same number of SDBs, as shown in this particular example.

The contents of a table entry address register (TEAR) 306 point to the current entry of a sample data block table 302. There are two kinds of entries in each sample data block table including, for instance: block link entries 308 and table link entries 310. Each block link entry 308 includes a sample data block (SDB) origin, and each table link entry includes a sample data block table (SDBT) origin. In this particular embodiment, each sample data block table starts at an integral boundary of 16 bytes, and each entry is 8 bytes. Each sample data block table 302 includes a number of block link entries 308 and one table link entry 310. A specified bit in each entry (e.g., bit 63) distinguishes a block link entry from a table link entry. When bit 63 is zero, the entry is a block link entry; when bit 63 is one, the entry is a table link entry. A table link entry is the last entry in the sample data block table. The actual size of a sample data block table is determined by the location of the table link entry, and does not exceed the size specified in the maximum buffer size indicator. The origin and the table link entry of a sample data block table cannot be separated by an integral boundary of the maximum buffer size, in this embodiment.

When a maximum buffer size indicator 320 is zero, a specified portion (e.g., bits 0-51) of a block link entry include the origin of a sample data block in real or absolute storage. When the sample data block origin is to be placed in the data entry address register, it is appended with zeros (e.g., 12 zeros) on the right to form a 64 bit address and the address is then placed in the register.

When maximum buffer size indicator 320 is one, specified bits (bits 0-43 of a block link entry include the origin of a sample data block in real or absolute storage. When the sample data block origin is to be placed in the data entry address register, it is appended with a number of zeros (e.g., 20) on the right to form a 64 bit address and the address is then placed in the register.

In one example, bits 0-59 of table link entry 310 include the origin of a sample data block table in real or absolute storage. When the sample data block table origin is to be placed in the table entry address register, it is appended with a number of zeros (e.g., 4) on the right to form a 64 bit address and the address is then placed in the register.

Continuing to refer to FIG. 3, the contents of a data entry address register 330 designates the next data entry 332 of a sample data block 304. Each sample data block starts at an integral boundary of the maximum buffer size. The size of a sample data block is equal to the size specified in the maximum buffer size indicator.

In one example, there are two kinds of entries in each sample data block, including, for instance, data entry 332 and a trailer entry 336. The last number of bytes (e.g., 64) of a sample data block form the trailer entry; all other space in the block is used to form data entries.

When at least one sampling function is active, a data entry is stored during each sampling interval. If only the basic sampling function is active, the data entry stored is a basic sampling data entry; if only the diagnostic sampling function is active, the data entry stored is a diagnostic sampling data entry. If both sampling functions are active, the data entry stored is a combined data entry. Each of these data entries is explained in further detail below.

Figure 4A:
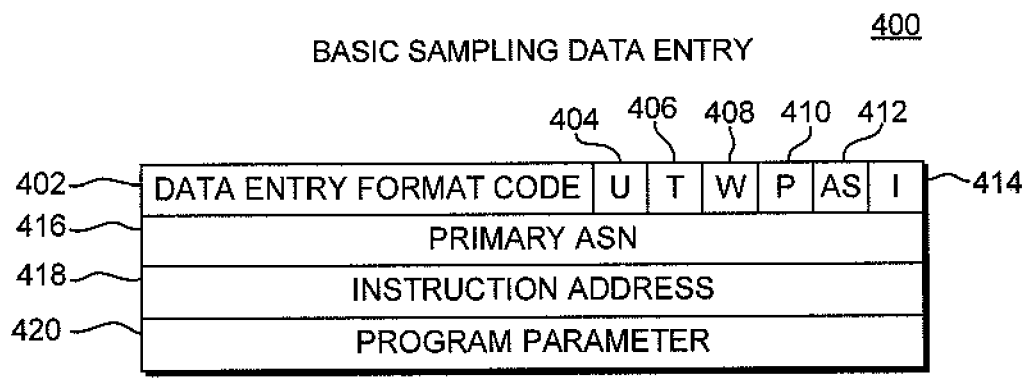
FIG. 4A depicts one embodiment of the fields of a basic sampling data entry, in accordance with an aspect of the present invention.

One example of the basic sampling data entry is described with reference to FIG. 4A. In one example, a basic sampling data entry 400 includes, for instance, the following fields:

(a) Data Entry Format Code 402: Bits 0-15 of the data entry include the format code of the data entry.

(b) Number of Unique Instructions (U) 404: Bits 20-23 of the data entry specify the number of unique, completed instructions that were executed simultaneously during the sampling cycle when the unique cycle indicator was on.

A pipelined CPU can execute multiple instructions concurrently in an overlapped fashion: each of these instructions being executed concurrently is in a different pipeline stage. Furthermore, on some models, each stage of a pipelined CPU may execute multiple instructions simultaneously.

During an instruction execution, a unique cycle indicator is turned on for one cycle at the sample point, that is the place in the CPU the sample data is taken from. The sampling point depends on the model, but is the same for all instructions executed on the same model. For a pipelined CPU, the sampling point is usually a particular pipeline stage. Depending on the model, it is unpredictable when the unique cycle indicator is turned on during an instruction execution. This field includes the number of instructions executed simultaneously at the sampling point when the unique cycle indicator is on.

When a sampling time occurs and if the sampling point is not busy because either the CPU is in the wait state or because of delay in some other pipeline stage, the contents of this field 404 are set to zero.

The contents of this field 404 can be used to estimate cycles per instruction when a sufficiently small sampling interval and an adequately larger number of samples are used.

The cycles per instruction for a particular measurement can be estimated by dividing the number of busy samples, that is samples with the wait state bit (described below) being set to zero, by the total number of unique instructions in all busy samples.

(c) DAT Mode (T) 406: Bit 26 of the data entry includes the data address translation (DAT) mode bit in the Program Status Word (PSW) of the CPU.

(d) Wait State (W) 408: Bit 27 of the data entry includes the wait state bit in the PSW of the CPU.

(e) Problem State (P) 410: Bit 28 of the data entry includes the problem state bit in the PSW of the CPU.

(f) Address Space Control (AS) 412: Bits 29-30 of the data entry include the address space control in the PSW of the CPU.

(g) Invalid Indication (I) 414: Bit 31 of the data entry indicates whether the entry is valid or invalid. When the bit is zero, the entry is valid; when the bit is one, the entry is invalid. An entry is set to invalid when sample data in the entry are not consistent.

(h) Primary ASN 416: Byte offsets 6-7 of the data entry include the Primary Address Space Number (PASN) in bits 48-63 of control register 4 of the CPU.

(i) Instruction Address 418: Byte offsets 8-15 of the data entry include the instruction address of an instruction that the CPU was executing during the sampling cycle.

Instruction addresses are treated as real addresses in the real mode; as primary virtual addresses in the primary address mode, secondary space mode, or access register mode; and as home virtual addresses in the home space mode.

When the sampling point is executing multiple instructions simultaneously during the sampling cycle, only the address of one instruction among these simultaneously executed instructions is reported. The selection of which instruction address to be reported is model dependent.

On some models, the address of the target instruction of Execute is not reported in the same data. When the wait state bit is one, the contents of this field 418 are unpredictable. When a sampling time occurs and if the sampling point is not executing any instruction because of delay in some other pipeline stage, it is unpredictable which address of the instructions being executed concurrently in the CPU is reported.

(j) Program Parameter 420: Byte offsets 16-23 of the data entry include the contents of the program parameter register.

Figure 4B:
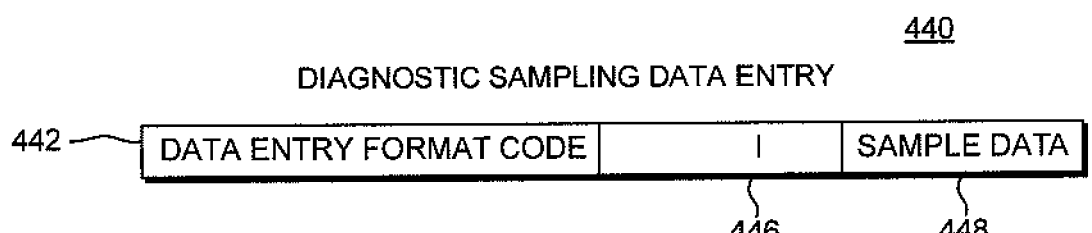
FIG. 4B depicts one embodiment of the fields of a diagnostic sampling data entry, in accordance with an aspect of the present invention.

One example of a diagnostic sampling data entry 440 is described with reference to FIG. 4B. In one example, diagnostic sampling data entr 440 includes:

(a) A data entry format code 442: Bits 0-15 of the data entry includes the format code of the data entry.

(b) Invalid Indication (I) 446: Bit 31 of the data entry indicates whether the entry is valid or invalid. When the bit is zero, the entry is valid; when the bit is one, the entry is invalid. An entry is set to invalid when sample data in the entry are not consistent.

(c) Sample Data 448: The rest of this entry includes non-architected sample data.

When both the basic sampling function and the diagnostic sampling function are active, the sample data stored during each sampling interval is a combined data entry, which includes a basic sampling data entry followed by a diagnostic sample data entry.

When a combined data entry is to be stored, it is completely stored in the current sample data block if there exists enough space. When there is not enough space in the current sample data block, if there is enough space in the next sample data block, then the entire combined sample data is stored in the next sample data block. The basic sampling data entry and the diagnostic sampling data entry of a combined data entry are not stored in different sample data blocks, in this example. When the combined sample data is discarded because of no space available, the sample overflow count of the current sample data block is incremented by one.

Figure 4C:
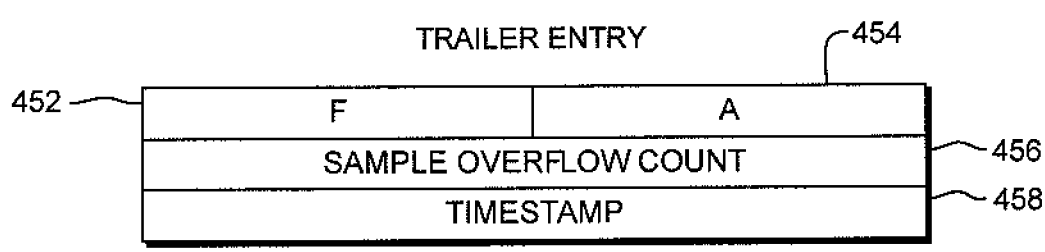
FIG. 4C depicts one embodiment of the fields of a trailer entry, in accordance with an aspect of the present invention.

One embodiment of the fields associated with a trailer entry are described with reference to FIG. 4C. Each trailer entry is, for instance, 64 bytes and resides in the last 64 bytes of a sample data block. In one example, a trailer entry 450 includes, for instance:

(a) Block Full Indicator (F) 452: Bit zero of byte offset 0 of the trailer entry is a block full indicator. When the indicator is one, the sample data block is full.

(b) Alert request control (A) 454: Bit 1 of byte offset 0 of the trailer entry is the alert request indicator. When the indicator is one and the sample data block becomes full, a program request alert external interruption event is recognized at the completion of the sample data block update process. Herein, the sample data block is considered full when its block full indicator is set, regardless of whether it is entirely full. If the block has additional space, but not enough to store the next sample, the indicator is set and the block is considered full.

The setting of the alert request control is selectable. For example, it can be set in every n (e.g., 10) data blocks. Thus, even if one data block of the buffer is full, there need not been an interrupt until a data block is reached with the indicator set, such as after the tenth full data block. The selection of 10 is only one example, any other desired number may be used. Thus, an interrupt is not taken after the sample interval or even after one data block is full.

(c) Sample overflow count 456: Bytes offsets 8-15 of the trailer entry include the number of sample data entries that have been lost because the sample data block is full.

(d) Timestamp 458: Byte offsets 16-31 of the trailer entry include the time-of-day (TOD) clock value at the time when the sample data block becomes full.

When a program request alert occurs, it is expected that the program (e.g., control program, such as an operating system running as a guest) reads out sample data from the sample data blocks that are full. To free up these blocks, the program shall reset the block full indicator (F) and the sample overflow count, and shall also reestablish an alert request control (A). Updating these fields in a sample data block shall be performed, in one example, as an interlocked update, using a Compare Double and Swap instruction. All of these reads and updates are performed while sampling functions remain active.

When the CPU is in the operating state and at least one sampling function is active, the sample data block update process is performed at each sampling time. The process locates space for the new data entry, forms the entry, and updates the contents of the data entry address register so that the register contents designate the location of the next data entry.

During the sample data block update process, if any address is formed through the addition of a value to another address, a carry out of bit position zero of the address, if any, is ignored. Similarly, when the contents of the sample overflow count field is incremented, a carry out of bit position zero of the count, if any, is ignored.

Accesses to a sample data block are not subject to key controlled protection; nor are they subject to low address protection.

When storage access to a sample data block entry or sample data block table entry is performed, if the address is invalid, a measurement alert external interruption event (invalid entry address) is recognized, and active sampling functions for that CPU are placed in the inactive state. An entry address is invalid if, for instance, the address is in the range 0-8191; if the designated sample data block entry is inside the trailer entry; or if the designated storage location is not available in the configuration.

When storage access to a sample data block table entry is performed, if any incorrect SDB table entry is detected, a measurement alert external interruption event (incorrect sample data block table entry) is recognized, and active sampling functions for that CPU are placed in the inactive state. A sample data block table entry is incorrect if the entry is a table link entry and it designates another table link entry, or if the last table entry is not a table link entry.

The contents of the data entry address register are used to locate the next data entry in the current sample data block. If the address of the next data entry is beyond the starting address of the trailer entry (e.g., last 64 bytes) of the sample data block, then a measurement alert external interruption event (invalid entry address alert) is recognized and sampling functions are placed in the inactive state.

One embodiment of the logic associated with updating a sampling buffer (e.g., a guest storage buffer), in accordance with an aspect of the present invention, is described with reference to FIGS. 5A-5B. This logic is performed by the machine (e.g., millicode, microcode and/or hardware of the central processor complex).

Figure 5A:
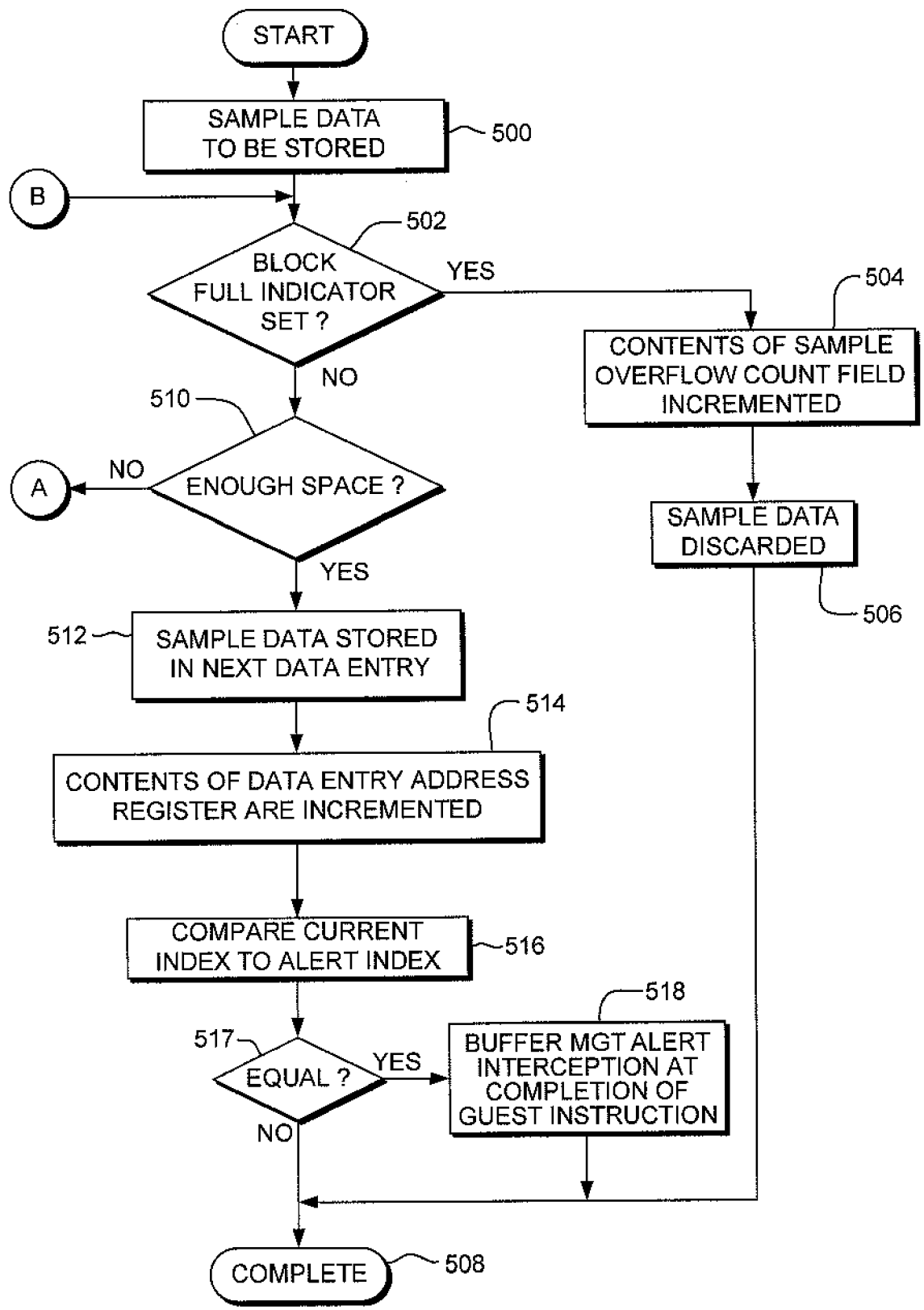
FIGS. 5A-5B depict one embodiment of the logic associated with updating a sampling buffer, in accordance with an aspect of the present invention.
Figure 5B:
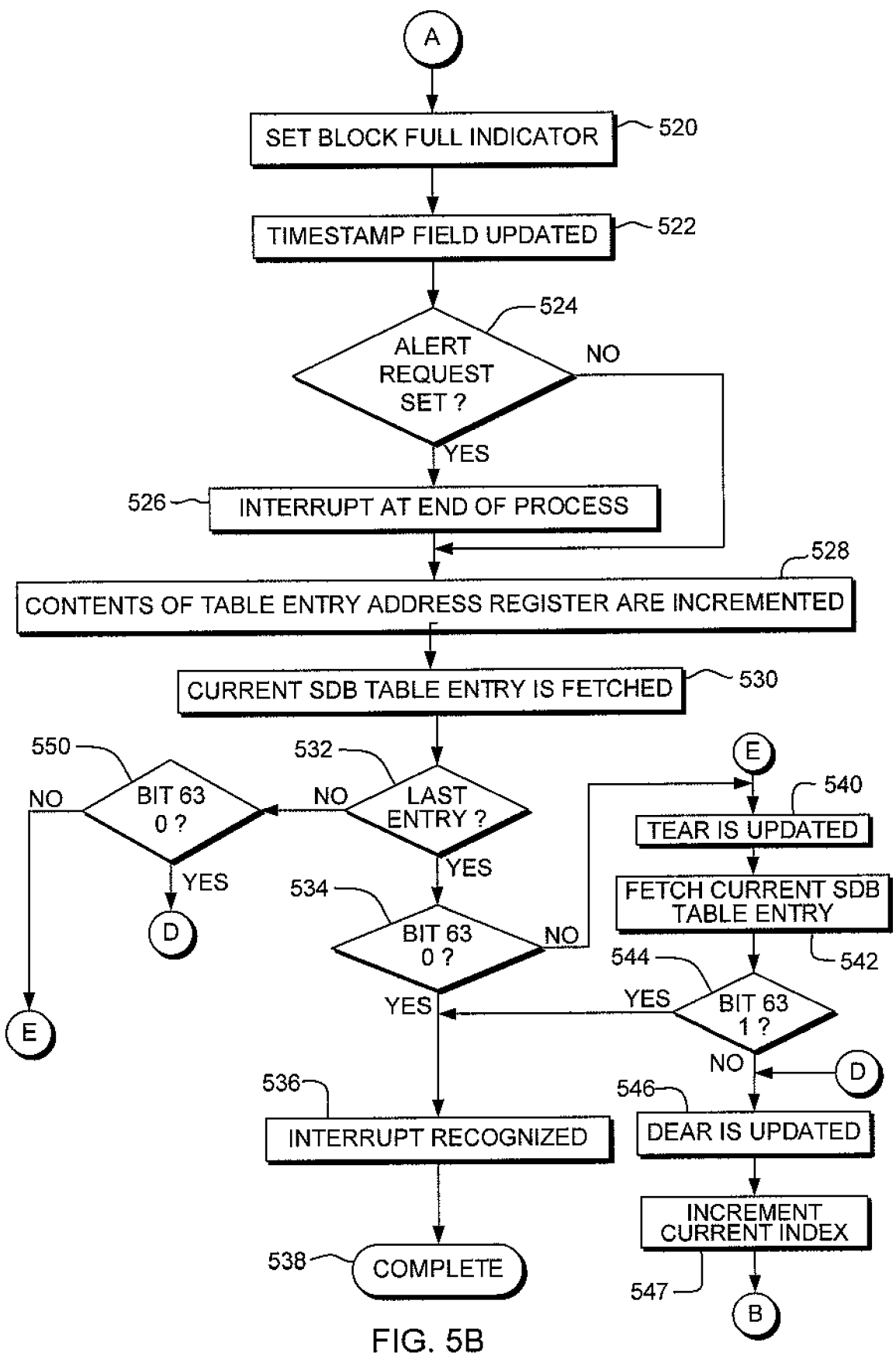

Referring to FIG. 5A, initially, sample data has been obtained during a sampling function and it is to be stored in the buffer, STEP 500. A determination is made as to whether the block full indicator in the trailer entry of the current sample data block is set (e.g., equal to one), INQUIRY 502. If the block full indicator is set, then at this point, it indicates that there is insufficient space in the buffer to store the data. The contents of the sample overflow count field of the trailer entry are incremented by one, STEP 504, and the sample data to be stored is discarded, STEP 506. This completes the update process, STEP 508.

Returning to INQUIRY 502, if, however, the block full indicator in the trailer entry of the current sample data block is zero, a determination is made as to whether there is enough space to store the sample data, INQUIRY 510. If the block full indicator is zero and there exists enough space, then the sample data is stored in the next data entry, STEP 512, and the contents of the data entry address register are incremented by the data entry size, STEP 514. Further, the guest SDB current index is compared with the guest SDB alert index, STEP 516. If the SDB current index is not equal to the SDB alert index, INQUIRY 517, then processing is complete. However, if they are equal, INQUIRY 517, then a buffer management alert interception is scheduled to be recognized at the completion of the current guest instruction, STEP 518. An example of this processing is described below. The update process is complete, STEP 508.

On the other hand, returning to INQUIRY 510, if the block full indicator is not set and there is not enough space to store the sample data in the next data entry, then the block full indicator in the trailer entry of the current sample data block is set to one, STEP 520 (FIG. 5B), and the time of day clock value is placed in the timestamp field of the trailer entry, STEP 522.

Thereafter, a determination is made as to whether the alert request indicator in the trailer entry is one, INQUIRY 524. If the alert request indicator in the trailer entry is one, a measurement alert external interruption event (program requested alert) is scheduled to be recognized at the end of the update process, STEP 526. Thereafter, or if the alert request indicator is not set, the contents of the table entry address register are incremented by the SDB table entry size so that the next entry in the SDB table becomes the current SDB table entry, STEP 528. The current SDB table entry is fetched and bit 63 of the entry is examined, STEP 530. If bit 63 of the SDB table entry is zero, the entry is a block link entry and includes a sample data block (SDB) origin; if bit 63 is one, the entry is a table link entry and includes a sample data block table (SDBT) origin.

If the fetched entry is the last entry in the SDB table (i.e., the entry is the last entry before reaching the maximum buffer size), INQUIRY 532, and if the entry is not a table link entry (i.e., bit 63 of the entry is zero), INQUIRY 534, then a measurement alert external interruption event (incorrect SDB table entry alert) is recognized, STEP 536. Active sampling functions are placed in the inactive state and the update process is complete, STEP 538.

Returning to INQUIRY 534, if it is the last entry and bit 63 is one, then the address of the origin of the SDB table specified in the entry is placed in the table entry address register so that the specified table becomes the current SDB table, STEP 540. The current SDB table entry is fetched and bit 63 of the entry is examined, STEP 542. If bit 63 is one, INQUIRY 544, indicating that the SDB table entry pointed to by the table link entry is itself a table link entry, a measurement alert external interruption event (incorrect SDB table entry alert) is recognized, STEP 536. Active sampling functions are placed in the inactive state and the update process is complete, STEP 538.

However, if bit 63 is zero, INQUIRY 544, then the address of the origin of the sample data block specified in the entry is placed in the data entry address register so that the block becomes the current sample data block, STEP 546. Further, the contents of the SDB current index field of the measurement block associated with the state description for the guest is incremented by, for instance, one, STEP 547. Processing then continues at INQUIRY 502 (FIG. 5A), as described above.

Returning to INQUIRY 532 (FIG. 5B), if the fetched entry is not the last entry in the SDB table (i.e., not the last entry before reaching the boundary), and if bit 63 of the fetched table entry is zero, INQUIRY 550, then processing continues at STEP 546, as described herein. However, if bit 63 of the fetched entry is one, indicating there are no more entries in the table, even though the table has more space, then processing continues with STEP 540, as described herein.

As indicated with reference to STEP 526, in response to determining that an alert request is set in the trailer entry of a sample data block that is indicated as full, a measurement alert external interruption event is recognized at the end of the update process. One embodiment of this processing is described with reference to FIG. 5C.

Figure 5C:
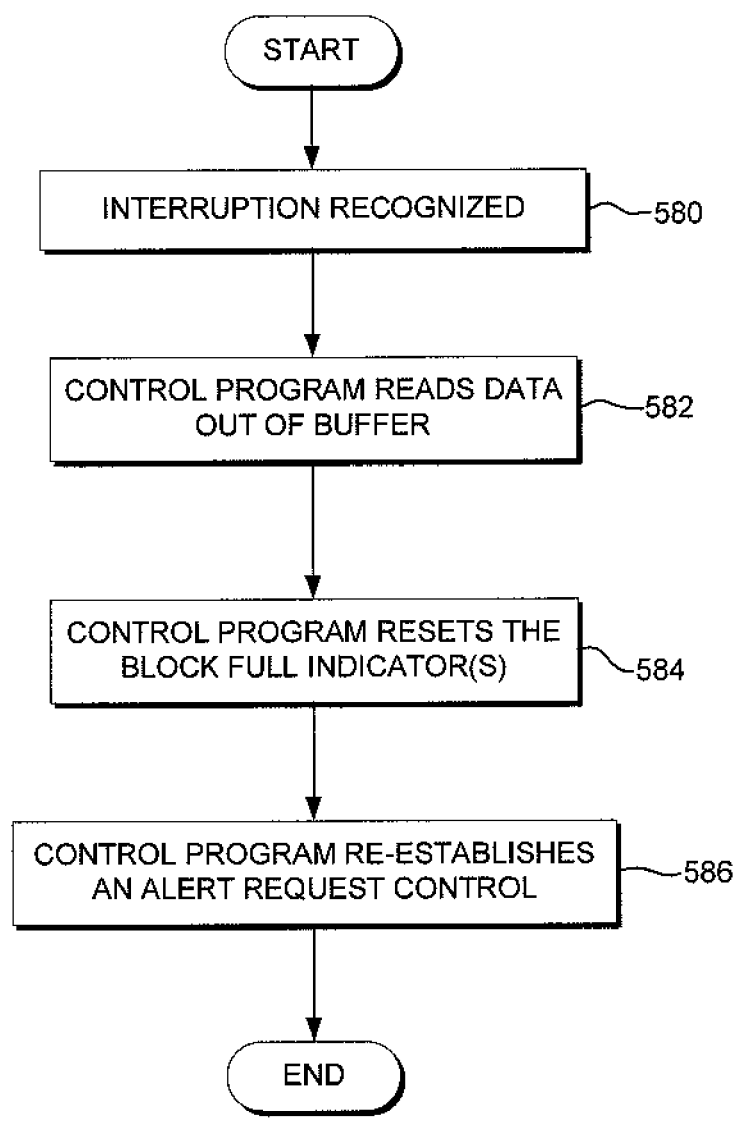
FIG. 5C depicts one embodiment of the logic associated with providing an interrupt to read the collected data from the buffer, in accordance with an aspect of the present invention.

Referring to FIG. 5C, an interruption is recognized at the end of the update process, STEP 580. In response thereto, the control program (e.g., operating system running as a guest) reads the data stored in one or more sample data blocks (e.g., the blocks that are full, or all the blocks that have data or a subset thereof) and writes that data to DASD or another storage medium, STEP 582. Additionally, in an interlocked update operation, the control program resets the block full indicator in the trailer entry of any of the blocks that were full, STEP 584, and re-establishes an alert request control STEP 586. In one example, the re-establishing includes setting (or leaving set) the same alert indicator that initiated the interrupt. In other examples, however, one or more other alert indicators can be set. An alert indicator can be set in one or more trailer entries, depending on how frequently the data is to be dumped.

The alert indicator is set, for instance, in at least one data block, which is selected to provide sufficient time to dump the data before the buffer is full, minimizing the loss of sample data. If, however, a small amount of data is lost, the collected data still continues to be useful. On the other hand, if a significant amount of data is lost, which is implementation dependent, then the collected sample data is ignored.

Figure 5D:
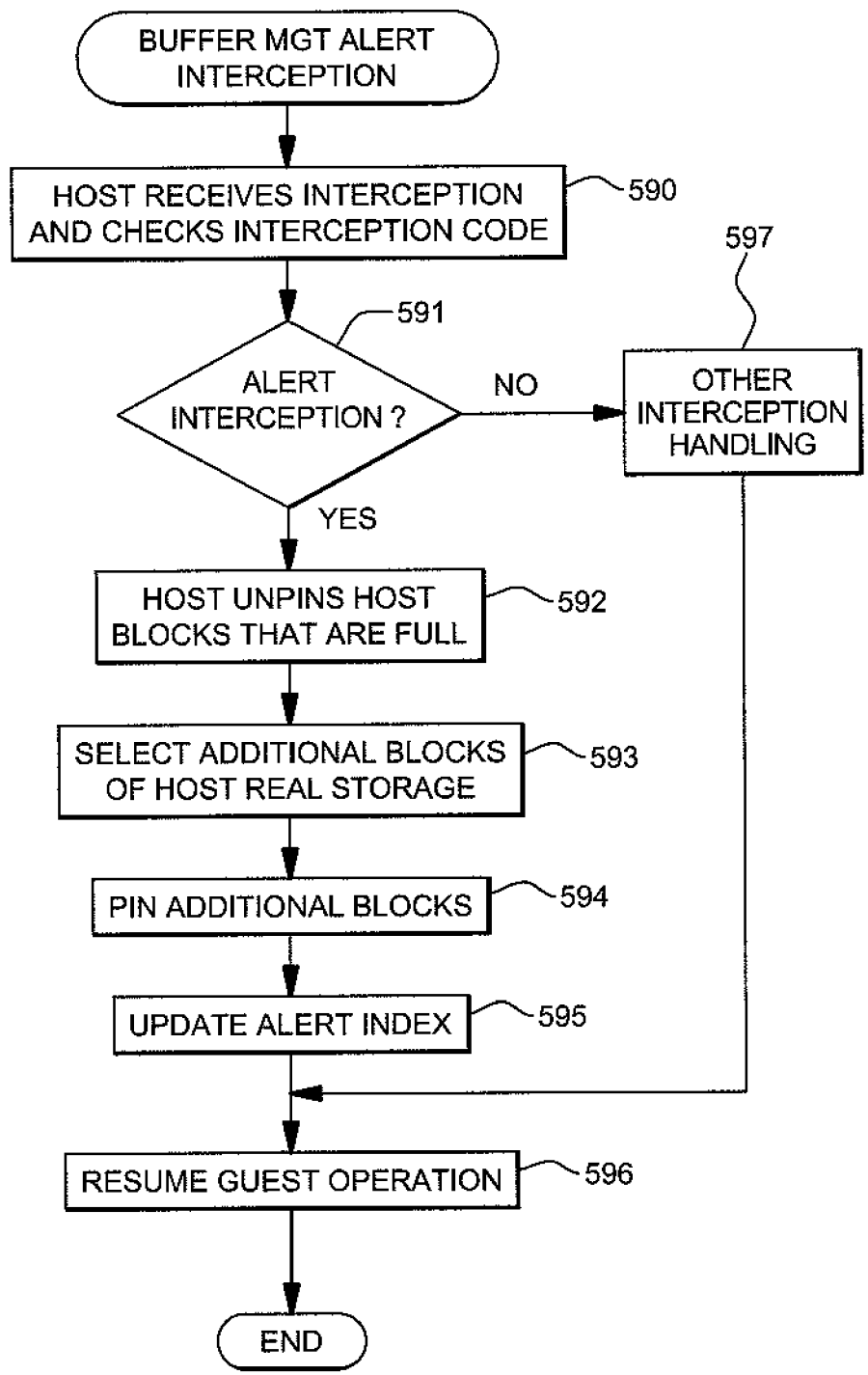
FIG. 5D depicts one embodiment of the logic used to handle a buffer management alert interception, in accordance with an aspect of the present invention.

Additionally, referring to INQUIRY 517 (FIG. 5A), if the SDB current index is equal to the SDB alert index, a buffer management alert interception occurs at the completion of the current guest instruction execution. Upon an interception, if the interception code in the guest state description is a particular value, such as, for instance, 36, indicating a buffer management alert interception, then the host performs certain steps. One embodiment of the logic associated with the host handling the buffer management alert interception is described with reference to FIG. 5D.

Initially, the host receives the interception and checks the interception code, STEP 590. If the alert interception code indicates a buffer management alert interception, INQUIRY 591, then the host unpins (decommits) the host blocks that are full, STEP 592. That is, the unpinned host real storage blocks map to host virtual addresses, which in turn map to the corresponding guest blocks, and are subject to host page faults. It unpins the pinned blocks except the current block pointed to by the DEAR register. Thereafter, the host pins the n-1 guest blocks that are immediately after the guest current sample data block pointed to by the DEAR register. At each interception, it is possible to select a different number of blocks; that is, n may vary on each occurrence. In order to pin these guest blocks, the host may need to allocate some number, x, of additional host real storage blocks to back those guest blocks that are not already resident in host real storage, STEP 593. Then, the host pins the n guest buffer blocks, STEP 594. That is, the host pages in the prior contents into the x real storage blocks as needed, and marks all n blocks pinned, that is, ineligible to be paged out. Further, the host increases the contents of the SDB alert index in the guest state description by a value of n minus 1, STEP 595. This reflects that the DEAR may be advanced through n-1 additional blocks, that is, the TEAR may advance through n-1 SDB-origin entries, before another alert is needed. Finally, the guest operation is resumed, STEP 596. (In one particular embodiment, for STEPs 593-594, each block of the guest buffer is treated independently. That is, a guest block is selected, in turn; a host block is allocated, if one is needed, and the guest contents are paged into the host block; the guest block is pinned; and then, the next block is selected.)

Returning to INQUIRY 591, if the alert interception code does not indicate a buffer management alert interception, then other interception handling is performed, STEP 597, and guest operation is resumed, STEP 596.

The buffer update process described with reference to FIGS. 5A-5D is part of an overall sampling process that takes place to capture sample data. The sampling process begins by an operator request, in response to which a sampling function is initiated. There may be one or more sampling functions initiated by one or more operators concurrently. One embodiment of an overview of a sampling process for a virtual environment is described with reference to FIGS. 6A-6B.

Figure 6A:
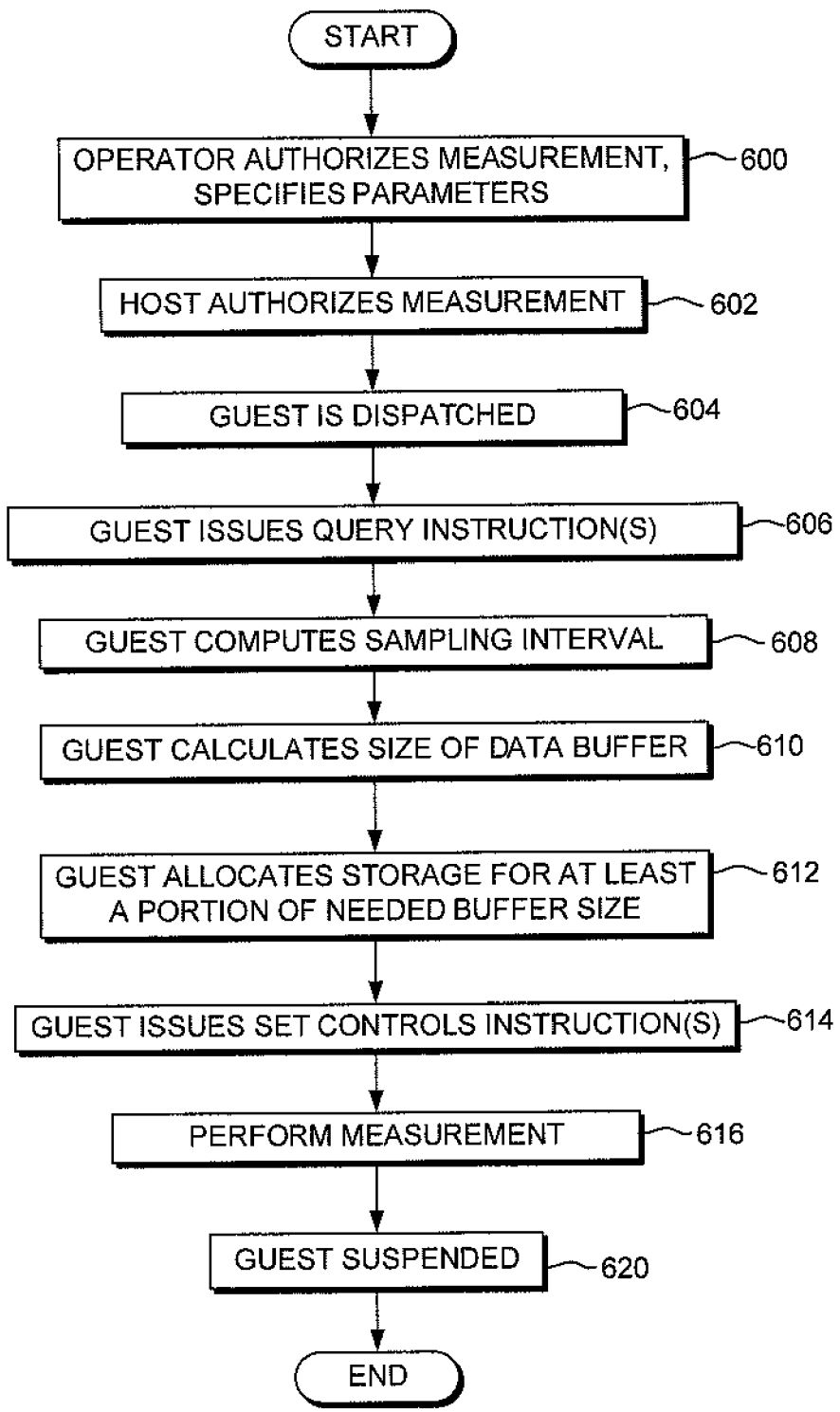
FIGS. 6A-6B depict one embodiment of an overview of the logic associated with performing a sampling function, in accordance with an aspect of the present invention.

Referring to FIG. 6A, initially, an operator invokes a sampling function and specifies various parameters including, for instance, the sampling frequency, F, (e.g., the number of samples to be collected per minute), the duration of the sampling run in minutes, D, and the type of sampling (e.g., basic, diagnostic, or combined), STEP 600.

Further, the host (e.g., z/VM®) authorizes sampling by setting an authorization indicator for a particular guest for which sampling is to be performed, STEP 602.

The guest (e.g., control program, such as an operating system) is dispatched, STEP 604. Thereafter, the guest issues a Query Sampling Information (QSI) instruction, described below, that provides information about the sampling facility, STEP 606. In one example, this information includes the basic sampling data entry size (BSDES) in bytes, the diagnostic sampling data entry size (DSDES) in bytes, and the CPU speed=C cycles/microseconds. With the obtained information, the control program calculates the sampling interval for each processor in the measurement=i cycles/sample, STEP 608. For instance, F=overall sampling frequency in samples/minute;
p=number of processors involved in the measurement;
f=(F/60)/p=individual sampling frequency for each processor in samples/second;
C=CPU speed in cycles/(10**−6) seconds;
i=(10**6/f)C=individual sampling interval for each processor in cycles/sample.

Further, the individual sampling frequency (defined above), f, the sample data entry size, L, and the specified duration of the sampling run, D, are used to calculate how large the data buffer for each processor needs to be, STEP 610. The sample data entry size, L, is calculated using the specified sampling type and the size of each entry type (BSDES and DSDES) returned by the QSI instruction. For instance, L=sampling data entry size in bytes;
if only basic sampling is used, L=BSDES;
if only diagnostic sampling is used, L=DSDES;
if both basic and diagnostic sampling are used, L=BDES+ DSDES;
f=individual sampling frequency for each processor in samples/second;
D=intended duration of the run in minutes;
B=f*L*D*60=buffer size in bytes needed for all of the samples on an individual processor for the entire sampling run.

Based on the above information, the guest allocates storage for the buffer, STEP 612. In accordance with an aspect of the present invention, the total buffer size need not be allocated by the guest. Instead, only a portion of the buffer is allocated and at specific times, an interrupt is initiated to remove data from the buffer by the guest and that same buffer may be reused. Guest storage is allocated for the desired buffer size and the storage is formulated into the form of the sampling data buffer described with reference to FIG. 3.

The buffer size allocated by the guest is to be large enough so that the guest can service the interruption before the allocated buffer is full. Allocating a buffer larger than this minimum value will require the guest to be interrupted less frequently. The time needed between guest interruptions is to guarantee servicing of each interrupt before the next is presented. The guest considers these factors when determining the portion of the needed buffer size to allocate.

The minimum size of the buffer to be allocated for each processor involved in the measurement, b, is calculated using the individual sampling frequency, f, the sample size, L, and the control program service interval, T. For instance, T=time in sec between control program interrupts needed to service the buffer;
b=f*L*T=minimum allocated buffer size in bytes.

Once the minimum and maximum values have been calculated, the guest determines a practical buffer size, including a safety margin. For example, the minimum buffer size, b, is multiplied by a value of 4 to allow the asynchronous writing of the buffer to occur without losing samples being collected concurrent to the write operation; it is understood that the write operation takes a nontrivial amount of time to complete.

Thereafter, the guest issues a Set Sampling Controls instruction, described below, to activate the sampling function, STEP 614. This instruction sets the appropriate enablement and activation bits in the sampling controls. In an aspect of the present invention, this instruction is intercepted to the host for special processing, as explained below. In response to processing this instruction, sampling is performed and the sampled data is handled in the manner described above with reference to FIGS. 5A-5D, STEP 616.

Figure 6B:
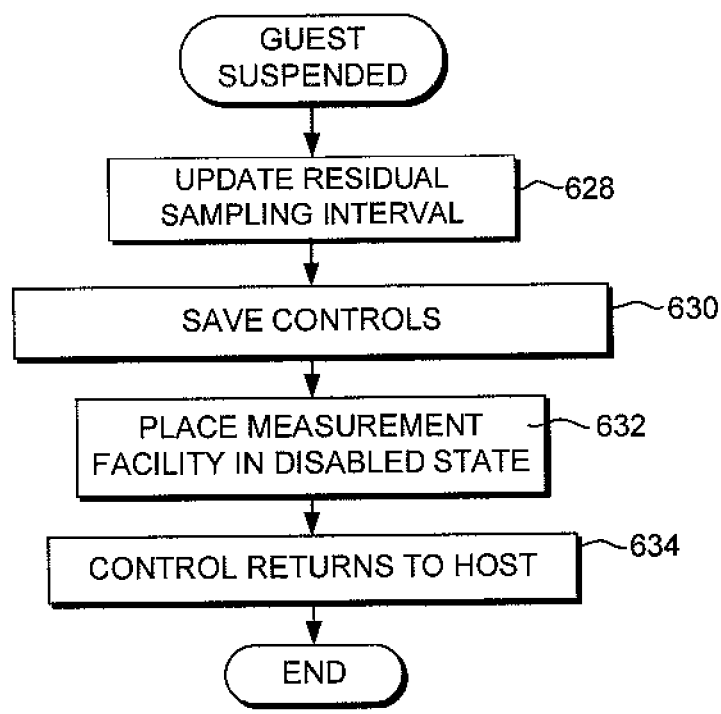

At some point, the guest is suspended and control is returned to the host, STEP 620. This can occur for a number of reasons including that the guest's time slice has expired. As part of suspension, a residual sampling interval indicator is updated, STEP 628 (FIG. 6B). This indicator is provided for each guest. When the guest time slice ends, this indicator is used to record the remaining time before the next sample is taken. For instance, if the sampling interval is 10 ms and the guest's last sample was taken 6 ms before being suspended, then 4 ms is saved in the residual sampling interval. This will be used as the time remaining in this sampling interval when this guest is redispatched. In one example, this indicator is stored in a measurement block associated with the guest, as described herein.

Additionally, controls are saved, such as sampling controls, STEP 630. Since this is a virtual environment, control blocks are provided to save the controls for each guest, as described herein (see, e.g., FIG. 2H). For example, the appropriate enablement and activation indicators are stored in the MAD and MCD in the state description. Moreover, the pending interruption parameter is saved in the state description.

Further, the sampling facility is placed in a disabled state by setting one or more hardware indicators, STEP 632, and control returns to the host, STEP 634.

Asynchronous to the above, a dispatcher of the control program issues a Set Program Parameter instruction, each time the dispatcher dispatches a task. The Set Program Parameter instruction tags the task with an identifier identifying the specific task. This identifier is provided along with the sample data (e.g., identifier is retrieved from register and included with data) such that it is known for which task the data belongs. Since the dispatcher is performance critical, there is no test to determine if the measurement facility is activated. Instead, this instruction is issued each time the dispatcher dispatches a task. In one example, if the configuration is not configured for sampling, then the instruction is executed as a no operation.

Figure 7:
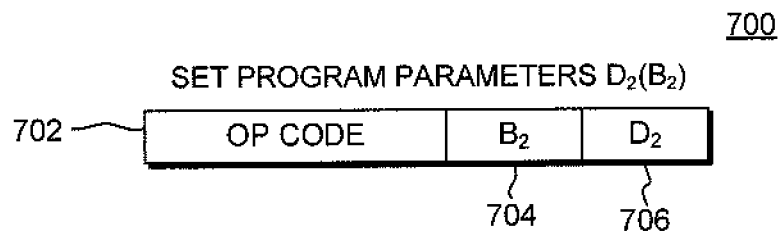
FIG. 7 depicts one example of a format of a Set Program Parameters instruction used in accordance with an aspect of the present invention.

One embodiment of the Set Program Parameter instruction is described with reference to FIG. 7. As one example, a Set Program Parameter instruction 700 includes the following fields:

(a) Op code 702: This field includes the operation code that specifies the Set Program Parameter instruction;

(b) $B_2$ 704 and $D_2$ 706: The contents of the general register designated by the $B_2$ field are added to the contents of the $D_2$ field to form a second operand address.

In execution, the eight byte program parameter in storage locations designated by the second operand address is placed in a program parameter register. In one example, this register is a 64-bit register, and the contents of this register are cleared to zeros by initial CPU reset, clear reset or power-on reset. As one particular example, the program parameter register is included within a state description maintained in host real storage.

Figure 8A:
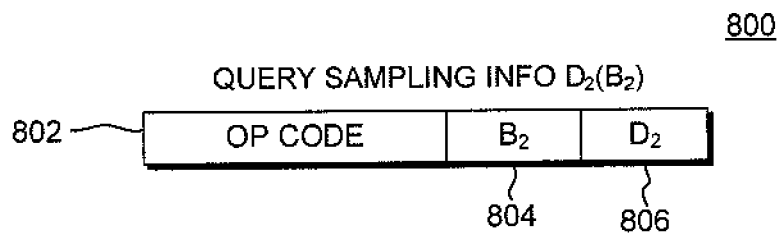
FIG. 8A depicts one embodiment of a format of a Query Sampling Information instruction used in accordance with an aspect of the present invention.

The Query Sampling Information instruction, referred to above, is used to place information about the CPU measurement sampling facility in an information block designated by the second operand address of the instruction. In one example, a Query Sampling Information instruction 800 (FIG. 8A) includes, for instance:

(a) Op code 802: This field includes the operation code that specifies the Query Sampling Information instruction;

(b) $B_2$ 804 and $D_2$ 806: The contents of the general register designated by the $B_2$ field are added to the contents of the $D_2$ field to form a second operand address.

Figure 8B:
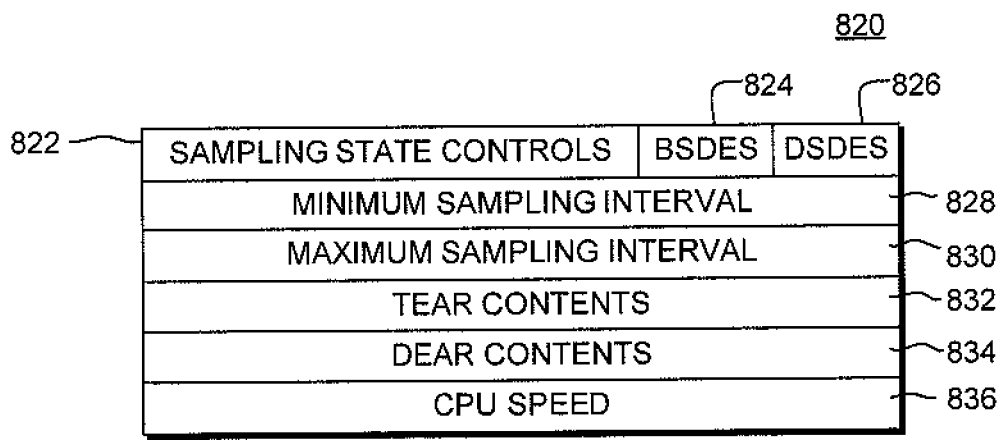
FIG. 8B depicts one embodiment of the fields associated with an information block associated with the Query Sampling Information instruction, in accordance with an aspect of the present invention.

In one example, the information block 820 (FIG. 8B) is 64 bytes and includes the following:

(a) Sampling State Controls 822: Byte offsets 0-3 of the information block include the state controls for the basic sampling and diagnostic sampling functions and have the following format, in one example:

| 0 | 0 | 0 | 0 | 0 | 0 | 0 | 0 | 0 | 0 | 0 | 0 | 0 | 0 | $A_s$ | $A_d$ |
|---|---|---|---|---|---|---|---|---|---|---|---|---|---|---|---|
| 0 | | | | | | | | 8 | | | | | | 14 | 15 |

| 0 | 0 | 0 | 0 | 0 | 0 | $E_s$ | $E_d$ | 0 | 0 | 0 | 0 | 0 | 0 | $C_s$ | $C_d$ |
|---|---|---|---|---|---|---|---|---|---|---|---|---|---|---|---|
| 16 | | | | | | 22 | 23 | | | | | | | 30 | 31 |

$A_s$ Basic sampling authorization control
$A_d$ Diagnostic sampling authorization control
$E_s$ Basic sampling enable control
$E_d$ Diagnostic sampling enable control
$C_s$ Basic sampling activation control
$C_d$ Diagnostic sampling activation control (b) Basic Sampling Data Entry Size (BSDES) 824: Byte offsets 4-5 of the information block include an unsigned binary integer, specifying the size in bytes of the basic sampling data entry. This information is hard-coded, in one example, in the machine.

(c) Diagnostic Sampling Data Entry Size (DSDES) 826: Byte offsets 6-7 include an unsigned binary integer, specifying the size in bytes of the diagnostic sampling data entry. This information is hard-coded, in one example, in the machine.

(d) Minimum Sampling Interval 828: Byte offsets 8-15 of the information block include the minimum sampling interval in number of CPU cycles. This information is hard-coded, in one example, in the machine.

(e) Maximum Sampling Interval 830: Byte offsets 16-23 include the maximum sampling interval in number of CPU cycles. This information is hard-coded, in one example, in the machine.

(f) TEAR Contents 832: When the basic sampling or diagnostic sampling function, or both, are enabled, byte offsets 24-31 of the information block include the contents of the table entry address register. When neither the basic sampling nor diagnostic sampling function is enabled, zeros are stored in byte offsets 24-31 of the information block.

(g) DEAR Contents 834: When the basic sampling or diagnostic sampling function, or both are enabled, byte offsets 32-39 of the information block include the contents of the data entry address register. When neither the basic sampling nor the diagnostic sampling function is enabled, zeros are stored in byte offsets 32-39 of the information block.

(h) CPU Speed 836: Byte offsets 44-47 include an unsigned binary integer, which specifies the CPU speed in number of CPU cycles per microsecond. This information is provided, in one example, by machine based on the model.

Figure 9A:
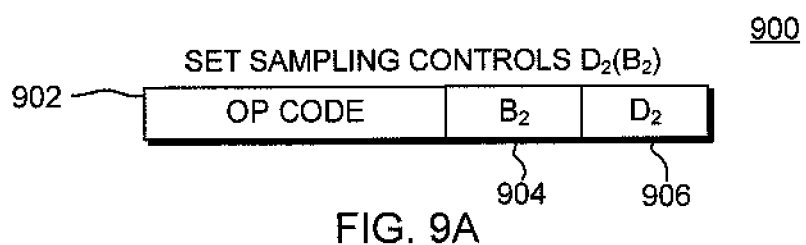
FIG. 9A depicts one embodiment of a format of a Set Sampling Controls instruction used in accordance with an aspect of the present invention.

The Set Sampling Controls instruction, an example of which is described with reference to FIG. 9A, is used to update the sampling controls. In one embodiment, a Set Sampling Controls instruction 900 includes the following format, in one example:

(a) Op Code 902: This field includes the operation code that specifies the Set Sampling Controls instruction;

(b) $B_2$ 904 and $D_2$ 906: The contents of the general register designated by the $B_2$ field are added to the contents of the $D_2$ field to form a second operand address.

During instruction execution, the sampling controls in the request block in storage locations designated by the second operand address are placed in the corresponding sampling control registers. The values of the controls in the request block are provided by the operator and/or the control program (e.g., operating system running as a guest), as indicated below.

Figure 9B:
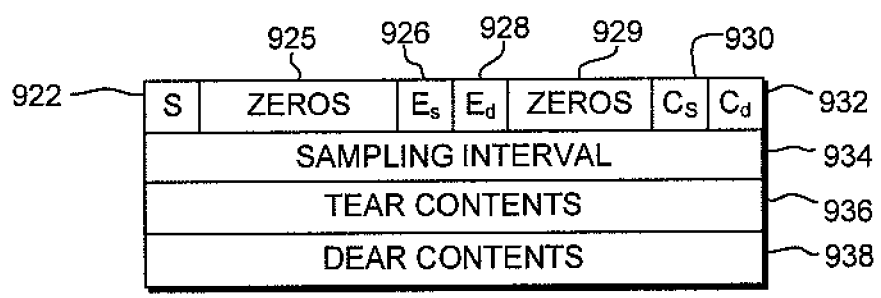
FIG. 9B depicts one embodiment of a request block associated with the Set Sampling Controls instruction, in accordance with an aspect of the present invention.

In one example, the request block is 64 bytes and includes the following fields, as described with reference to FIG. 9B:

(a) S922: Bit 0, S, of the request block specifies the maximum buffer size indicator, as specified by the control program.

(b) $E_s$ 926: Bit 54, $E_s$, of the request block specifies the basic sampling enable control, which is set based on an input parameter from the operator;

(c) $E_d$ 928: Bit 55, $E_d$, of the request block specifies the diagnostic sampling enable control, which is set based on an input parameter from the operator.

(d) $C_s$ 930: Bit 62, $C_s$, of the request block specifies the basic sampling activation control, which is set based on an input parameter from the operator.

(e) $C_d$ 932: Bit 63, $C_d$, of the requested block specifies the diagnostic sampling activation control, which is set based on an input parameter from the operator. Bits 2-53 (925) and 56-61 (929) of the request block are zeros.

The specified enable and activation controls of sampling functions are set only if both sampling functions can make a valid state transition. If a sampling function cannot make a valid state transition, the specified state controls are not set for any sampling function.

When a sampling function is set to the active state from the disabled, inactive, or active state, the additional controls, including the maximum buffer size indicator, sampling interval 934, table entry address register contents 936, and the data entry address register contents 938 are placed in the sampling control registers. When no sampling function is placed in the active state by the operation, the additional controls are ignored and are not placed in the sampling control registers.

When a sampling function is to be set to the active state from the disabled, inactive, or active state, and if the requested sampling interval is outside the supported range, no sampling control, including any state control, in the sampling control registers is changed and a specification exception is recognized. The supported sampling interval range is between the maximum and minimum sampling intervals, inclusively, provided by executing the Query Sampling Information instruction.

In one example, when the enable and activation controls for both sampling functions are set, condition code 0 is set. When the enable and activation controls are not set, condition code 3 is set.

Figure 10A:
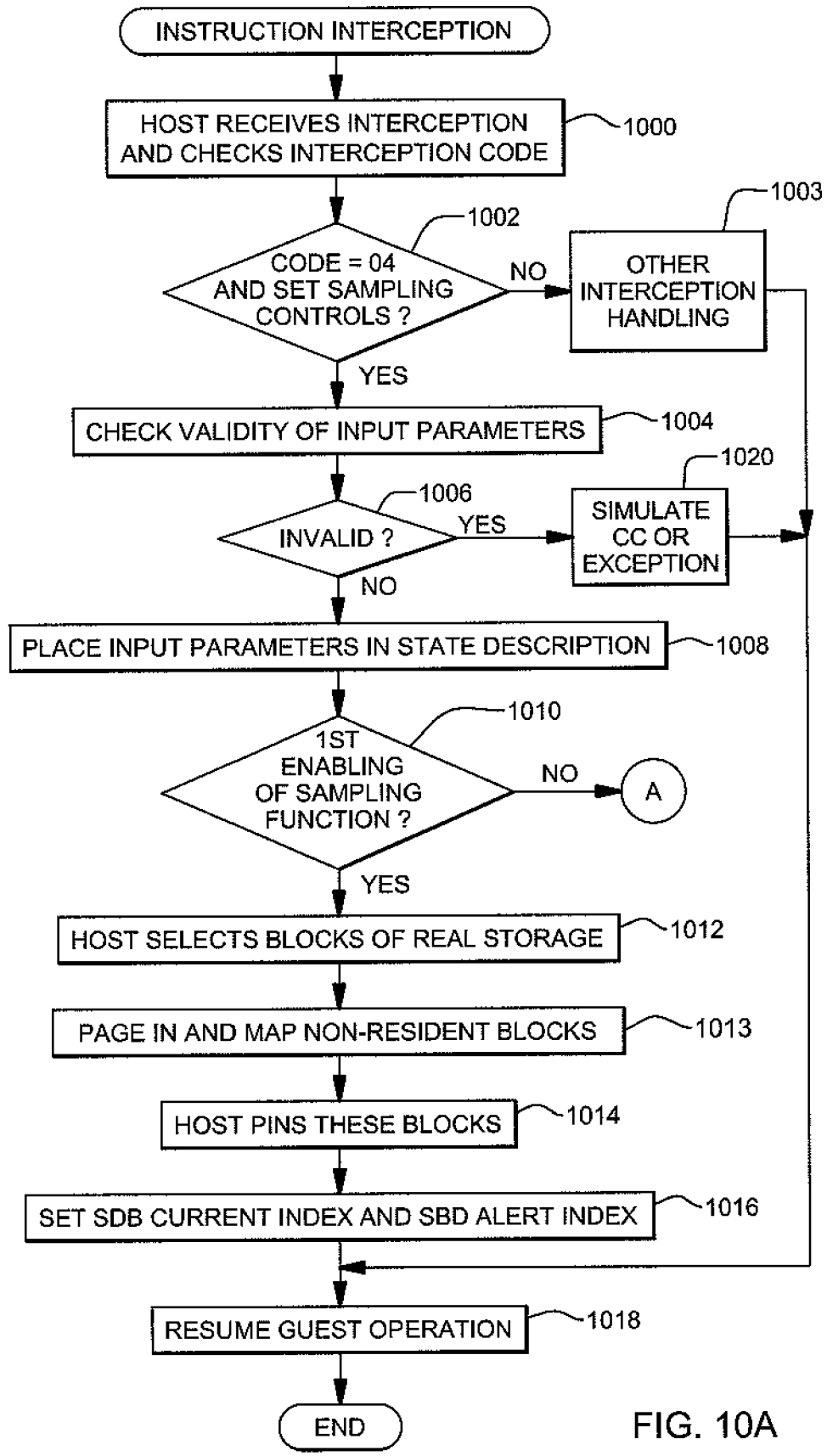
FIGS. 10A-10B depict one embodiment of the logic to handle an instruction interception for the Set Sampling Controls instruction, in accordance with an aspect of the present invention.

In accordance with an aspect of the present invention, execution of the Set Sampling Controls instruction by the guest causes a mandatory interception (e.g., interception code 04). One embodiment of the logic associated with handling this interception is described with reference to FIGS. 10A-10B. This logic is performed by the host.

In one embodiment, the host receives the interception and checks the interception code, STEP 1000. If the code in the guest description is a defined value indicating an instruction interception, such as 04, and if the guest instruction that caused the interception is a Set Sampling Controls instruction, INQUIRY 1002, then the host performs a series of steps. Otherwise, other interception handling is performed, STEP 1003, and guest operation is resumed, STEP 1018.

Returning to INQUIRY 1002, if the code in the guest description is the defined value and if the guest instruction that caused the interception is Set Sampling Controls, then the host checks the validity of the input parameters of the Set Sampling Controls instruction, STEP 1004. If all of the input parameters are valid, INQUIRY 1006, then the input parameters are placed in the guest state description, STEP 1008. In one example, some of these parameters are placed in the measurement block associated with the state description.

Thereafter, a determination is made as to whether all sampling functions are currently disabled and this guest execution of the Set Sampling Controls instruction enables any sampling function, INQUIRY 1010. If so, then the host pins a defined number of blocks (e.g., n) at the start of the guest buffer. To do this, the host identifies which guest blocks in this range are not currently resident in host real memory, and selects this number of available host real storage blocks, STEP 1012. The host pages these non-resident guest blocks into the selected real storage blocks and maps the guest blocks to the corresponding real storage blocks, STEP 1013, and pins (that is, marks ineligible to be paged out) all n guest buffer blocks, STEP 1014. (In one particular embodiment for STEPs 1012-1014, a guest block is selected, a host block is allocated, if needed, and the guest contents are paged into the host block; and the guest block is pinned. Then, a next block is selected.)

Additionally, the host sets the SDB current index in the guest measurement block to zero, and sets the SDB alert index in the guest measurement block to the defined number (n) minus 1, for example, STEP 1016. This allows n−1 blocks of additional samples to be taken before the next alert. Thereafter, guest operation is resumed, STEP 1018. (In an alternate embodiment, an alert is taken when the last block in the set becomes full.)

Returning to INQUIRY 1006, if any input parameter is invalid, then, depending on which parameter is invalid, the host either simulates a particular condition code (such as condition code 03) or a specification exception to the guest, STEP 1020. The guest operation resumes, STEP 1018, and the host process is complete.

Figure 10B:
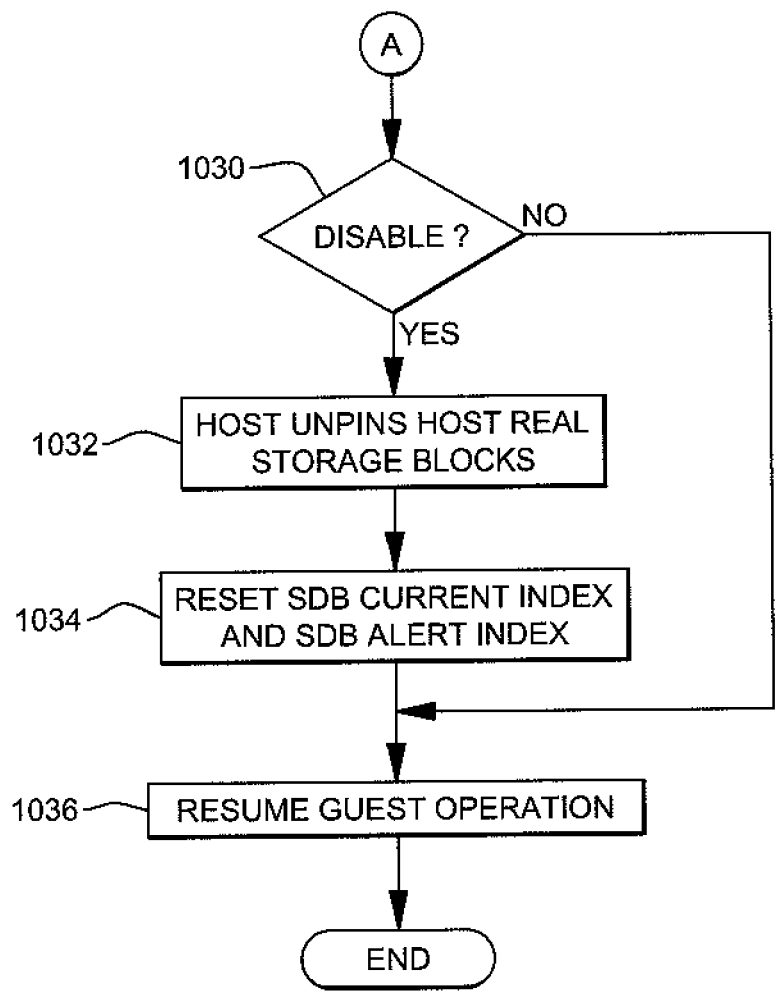

Returning to INQUIRY 1010, if it is not true that all sampling functions are currently disabled and this guest execution of the Set Sampling Controls instruction enables a sampling function, then processing continues with STEP 1030 (FIG. 10B). A determination is made as to whether some sampling functions are currently enabled and this guest execution of Set Sampling Controls disables the enabled sampling functions, INQUIRY 1030. If so, then the host unpins the guest buffer blocks that were pinned before, STEP 1032, and sets both the SDB current index and the SDB alert index in the guest measurement block to zeros, STEP 1034. Thereafter, guest operation is resumed, STEP 1036.

Returning to INQUIRY 1030, if not, then guest operation is resumed, STEP 1036.

Described in detail above is the updating of a large guest storage buffer by an asynchronous process (e.g., the CPU measurement facility) and the manner in which that guest storage buffer is backed by host real storage. In accordance with an aspect of the present invention, only a portion of the guest buffer is required to be resident in host real storage at a time, sufficient to hold upcoming data to be stored by the asynchronous process, but the guest believes that real storage is available for the entire buffer. One or more indicators are used to determine when additional host real storage is to be provided, such that a page fault is avoided. This processing is transparent to the guest.

One or more aspects of the present invention can be included in a computer program product to facilitate one or more aspects of the present invention. The computer program product includes a storage medium readable by a processing circuit and storing instructions for execution by the processing circuit for performing one or more of the capabilities of the present invention.

In one example, an article of manufacture (e.g., one or more computer program products) having, for instance, computer readable media includes one or more aspects of the present invention. The media has therein, for instance, computer readable program code means or logic (e.g., instructions, code, commands, etc.) to provide and facilitate the capabilities of the present invention. The article of manufacture can be included as a part of a computer system or sold separately.

Figure 11:
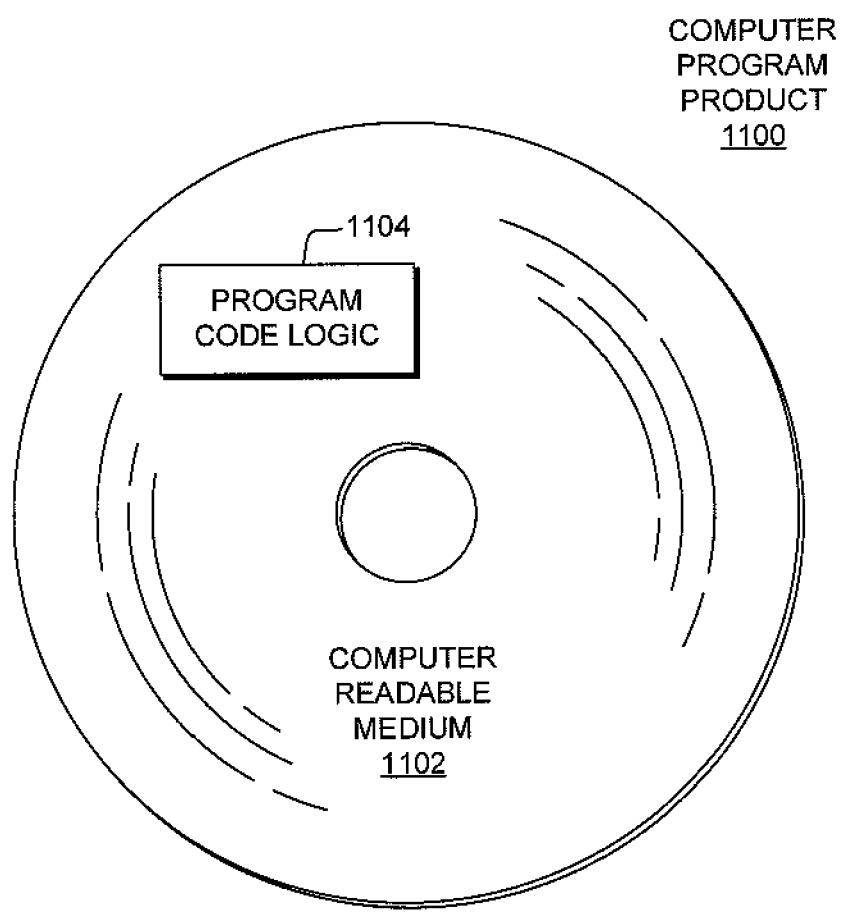
FIG. 11 depicts one embodiment of a computer program product incorporating one or more aspects of the present invention.

One example of an article of manufacture or a computer program product incorporating one or more aspects of the present invention is described with reference to FIG. 11. A computer program product 1100 includes, for instance, one or more computer readable media 1102 to store computer readable program code means or logic 1104 thereon to provide and facilitate one or more aspects of the present invention. The medium can be an electronic, magnetic, optical, electromagnetic, infrared, or semiconductor system (or apparatus or device), as examples. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer readable medium, in which the computer readable medium comprises one or more aspects of the present invention. The code in combination with the computer system is capable of performing one or more aspects of the present invention.

Advantageously, in accordance with an aspect of the present invention, the host only pins a small amount of host real storage to a guest storage buffer at a time. In particular, the host pins a small number of blocks (e.g., frames) for a window of the guest sample data blocks. Then, indices (e.g., two) are used to determine when the window is to be moved. A current index specifies the index of the current data block address entry in the window list. Another index is the host alert index which specifies the entry that causes an interception to the host when the current index equals the host alert index. The alert allows the host to move the pinned window before all pinned blocks are full.

In one particular example, the indices specify relative positions with respect to the contents of TEAR at the time the guest issues the Set Sampling Controls instruction. So, when the instruction is issued by the guest, the address pointed to by TEAR has an index value of zero, in one example. If the host pins n blocks, then the host sets the host alert index to n−1. When sampling data is being stored, DAT exceptions caused by accessing blocks with indices that are smaller than or equal to the host alert index result in an invalid entry address external exception to the guest and the sampling function is placed in the disabled state. When the machine stores into a block of the index that is equal to the host alert index, the host buffer alert interception occurs at the completion of that store. The host then unpins all previous pinned blocks except the block pointed to by the TEAR, pins the next n blocks, adds n to the value of the host alert index, and resumes the guest.

Advantageously, one or more aspects of the present invention enable support for large guest storage buffers without requiring that the buffer be backed by real storage all at once. The indices used to determine when additional real storage is to be pinned provide an easy and efficient mechanism to ensure that page faults are avoided.

Although various embodiments are described above, these are only examples. For instance, although various instructions are described herein, one or more aspects of the present invention can use other than instructions, such as commands, functions, etc. Further, the format of the instructions may be different, including different fields, different size fields, different positioning, etc. Yet further, the information of entities (e.g., request blocks, fields of entries, information blocks) described herein can have different information, the size of the fields can be different, as well as the positioning. Reserved fields or those with zeros may have been eliminated from the entities. Moreover, some of the information in the entities may not be used or needed for one or more aspects of the present invention. Many other variations can be made.

Yet further, although the example described herein is with reference to an asynchronous measurement facility, one or more aspects of the present invention are applicable to other asynchronous processes. The CPU measurement facility is only one example. One or more aspects of the present invention are applicable to any asynchronous processes that employ large storage buffers.

Moreover, although two indices are described herein for use in determining when additional host real storage is to be pinned, in a further embodiment, more or fewer indices or other indicators may be used. For instance, in another embodiment, one indicator is used that keeps track of how many host real storage units are available to use. When a unit of guest storage is no longer to be used and a new unit is to be stored into, the indicator is updated (e.g., decremented or incremented). When it reaches a predetermined value (e.g., zero or other selected value, when decremented), an alert is generated.

In a further embodiment, efficiency can be improved if the host is aware of whether the guest has consumed the prior contents of a non-resident sample buffer block when that block is to be pinned again to be refilled. In the likely case, the guest will have consumed the data by this time, and the prior contents are no longer useful. In this case, the host can avoid the overhead of paging in the prior contents, and instead, pin the block to a frame from, for example, a pool of available cleared host real blocks. However, if the guest has not yet consumed the prior contents, then they are to be paged back in and pinned, as described above, allowing the guest further opportunity to consume the prior contents before the new samples overwrite them. To distinguish these cases, a copy of the block full indicator is kept in, for instance, the SDBT entry 308 containing the SDB origin. When the block is marked full in its trailer, STEP 520, this copy of the indicator is also set in the SDBT entry designated by the TEAR, before the TEAR is advanced. When the guest has consumed the sample data and reset the full indicator 452 in the trailer of a block, within STEP 528, it then resets the copy of the full indicator in the SDBT entry. When the host processes an alert interception and allocates host real blocks for the next guest buffer blocks to be filled, STEP 593, it tests this copy of the block full indicator to determine whether the prior contents need to be paged in as described for STEP 594 (if the copy indicates the guest has not yet consumed the contents) or whether the paged-out copy of the prior contents can be discarded and the guest block pinned to a fresh, cleared frame (if the copy indicates the guest has consumed the contents). Advantageously, this avoids unnecessary host paging overhead in the common case, while maximizing the guest's opportunity to consume the sample data in the case where that process is running slowly.

Although an example of a processing environment is provided herein, this is only one example. Many other examples of processing environments may incorporate and use one or more aspects of the present invention. For example, a processing environment may have only one CPU supporting one or more guests. In a further example, a processing environment may be executing different control programs than described herein. Yet further, a hypervisor other than z/VM® may be used.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage to hold portions of the program and data not immediately needed, and cache memory which provides temporary storage of at least some program code and data in order to reduce the number of times these must be retrieved from local memory during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating the providing of host real storage for guest storage buffers in a virtual processing environment, the computer-implemented method comprising:
    storing data into a guest storage buffer in memory, the guest storage buffer to be used by asynchronous processes in a virtual processing environment, the virtual processing environment comprising a host to provide the host real storage and one or more guests managed by the host, the guest storage buffer having n units of host real storage committed thereto and being larger than a total size of the n units of host real storage, and wherein the storing comprises storing data into a current unit of the guest storage buffer, said current unit of the guest storage buffer being backed by a committed unit of host real storage;
    detecting that the guest storage buffer is to have one or more additional units of host real storage committed thereto, wherein the detecting comprises comparing a value of an alert indication located in a data structure that includes control information with a value of another indication, separate from the alert indication, and determining that the values are equal, wherein the value of the another indication is to be increased based on storing into a next unit of the guest storage buffer, and wherein the value of the alert indication is updated based on committing the one or more additional units of host real storage to the guest storage buffer;
    specifying to the host that action is to be taken by the host to commit the one or more additional units of host real storage, based on detecting, using the alert indication, that one or more additional units of host real storage are to be committed to the guest storage buffer, wherein the specifying comprises generating an alert interception to the host indicating that action is to be taken by the host to commit the one or more additional units of host real storage wherein upon the host receiving the alert interception:
    decommitting, based on the alert interception, units of committed host real storage committed to the guest storage buffer that are full other than the unit of host real storage committed to the current unit of the guest storage buffer, and subsequently committing, based on the alert interception, the one or more additional units of host real storage to the guest storage buffer; and
    updating, based on the decommitting and committing, the value of the alert indication, the updating increasing the value by a number that is based on a count of the one or more additional units of host real storage committed to the guest storage buffer.

2. The computer-implemented method of claim 1, wherein the another indication includes a current indication stored within the data structure that indicates the current unit of the guest storage buffer, a value of the current indication to be updated based on obtaining an address of the next unit of the guest storage buffer to be the current unit of the guest storage buffer.

3. The computer-implemented method of claim 2, wherein the comparing comprises comparing the value of the alert indication and the value of the current indication, and wherein the specifying comprises generating the alert interception, based on the value of the alert indication equaling the value of the current indication.

4. The computer-implemented method of claim 2, wherein the current indication is incremented, based on storing into the next unit of the guest storage buffer, the next unit of the guest storage buffer being backed by another unit of the n units of host real storage committed to the guest storage buffer.

5. The computer-implemented method of claim 2, wherein the current indication and the alert indication specify relative positions within the guest storage buffer.

6. The computer-implemented method of claim 1, wherein a number of units of host real storage to be committed may vary from one instance of the host handling the alert interception to a next instance of the host handling the alert interception.

* * * * *